(12) United States Patent
Kando

(10) Patent No.: US 12,420,196 B2
(45) Date of Patent: Sep. 23, 2025

(54) COMPUTER-READABLE NON-TRANSITORY STORAGE MEDIUM HAVING INFORMATION PROCESSING PROGRAM FOR STORING FOOTPRINT COORDINATE SETS IN ORDER OF TIME SERIES

(71) Applicant: Nintendo Co., Ltd., Kyoto (JP)

(72) Inventor: Yuji Kando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 245 days.

(21) Appl. No.: 18/478,339

(22) Filed: Sep. 29, 2023

(65) Prior Publication Data

US 2024/0115941 A1    Apr. 11, 2024

(30) Foreign Application Priority Data

Oct. 5, 2022   (JP) .................................. 2022-160681

(51) Int. Cl.
*A63F 13/56* (2014.01)
*A63F 13/45* (2014.01)
*A63F 13/55* (2014.01)
*A63F 13/57* (2014.01)
*A63F 13/573* (2014.01)
(Continued)

(52) U.S. Cl.
CPC .............. *A63F 13/56* (2014.09); *A63F 13/45* (2014.09); *A63F 13/55* (2014.09); *A63F 13/57* (2014.09); *A63F 13/573* (2014.09); *A63F 13/822* (2014.09); *A63F 13/428* (2014.09);
(Continued)

(58) Field of Classification Search
CPC ........ A63F 13/56; A63F 13/428; A63F 13/57; A63F 13/55; A63F 13/573; A63F 13/822; A63F 13/45; A63F 2300/6607; A63F 2300/807; A63F 2300/6623
See application file for complete search history.

(56) References Cited

U.S. PATENT DOCUMENTS 6,454,653 B1 *  9/2002  Kawazu ................. A63F 13/577
                                              463/43
6,525,736 B1 *  2/2003  Erikawa ................. A63F 13/426
                                              345/473
(Continued)

FOREIGN PATENT DOCUMENTS

JP    2001-000742    1/2001
JP    2005-287757    10/2005
(Continued)

*Primary Examiner* — William H Mcculloch, Jr.
(74) *Attorney, Agent, or Firm* — Nixon & Vanderhye PC

(57) ABSTRACT

A first object is moved to a first object coordinate set on the basis of an operation input, and along with the movement, a footprint coordinate set which is a coordinate set based on the first object coordinate set is stored in a time-series order. For a first footprint coordinate set among the stored plurality of footprint coordinate sets, whether or not a path to a second footprint coordinate set which is later in time series than the first footprint coordinate is passable is determined, and if the path is passable, the path is stored in association with the first footprint coordinate set. While a second object is being moved so as to track the stored plurality of footprint coordinate sets, if there is a passable path from a predetermined footprint coordinate set to a predetermined second footprint coordinate set, the second object is moved through the path.

11 Claims, 23 Drawing Sheets

(51) Int. Cl.
*A63F 13/822* (2014.01)
*A63F 13/428* (2014.01)

(52) U.S. Cl.
CPC ........... *A63F 2300/6607* (2013.01); *A63F 2300/6623* (2013.01); *A63F 2300/807* (2013.01)

(56) References Cited

U.S. PATENT DOCUMENTS

| | | | | |
|---|---|---|---|---|
| 6,729,954 | B2 * | 5/2004 | Atsumi | A63F 13/45 434/11 |
| 7,677,977 | B2 * | 3/2010 | Maehiro | A63F 13/00 273/317.1 |
| 7,785,198 | B2 * | 8/2010 | Kando | A63F 13/822 463/31 |
| 8,840,470 | B2 * | 9/2014 | Zalewski | H04N 21/4223 463/31 |
| 9,295,909 | B2 * | 3/2016 | Kando | A63F 13/00 |
| 10,403,018 | B1 * | 9/2019 | Worsham | A63F 13/55 |
| 12,023,590 | B2 * | 7/2024 | Fukada | A63F 13/422 |
| 12,064,693 | B2 * | 8/2024 | Wan | A63F 13/56 |
| 2002/0045470 | A1 * | 4/2002 | Atsumi | A63F 13/10 463/9 |
| 2005/0119050 | A1 * | 6/2005 | Suzuki | A63F 13/10 463/36 |
| 2005/0221880 | A1 * | 10/2005 | Kando | A63F 13/822 463/9 |
| 2006/0246974 | A1 * | 11/2006 | Tsuda | A63F 13/822 463/7 |
| 2007/0218992 | A1 * | 9/2007 | Maehiro | A63F 13/577 463/31 |
| 2008/0291173 | A1 * | 11/2008 | Suzuki | A63F 13/10 345/173 |
| 2009/0215533 | A1 * | 8/2009 | Zalewski | H04N 21/4755 463/32 |
| 2014/0357359 | A1 | 12/2014 | Kando | |
| 2017/0064240 | A1 * | 3/2017 | Mangat | G06F 16/9535 |
| 2019/0366212 | A1 * | 12/2019 | Kusakihara | A63F 13/426 |
| 2024/0115941 | A1 * | 4/2024 | Kando | A63F 13/428 |
| 2024/0252922 | A1 * | 8/2024 | Yamamoto | A63F 13/56 |
| 2024/0269561 | A1 * | 8/2024 | Fukada | A63F 13/537 |
| 2025/0205600 | A1 * | 6/2025 | Miyanaga | A63F 13/45 |

FOREIGN PATENT DOCUMENTS

| | | |
|---|---|---|
| JP | 2005287757 A | 10/2005 |
| JP | 2007-244536 | 9/2007 |
| JP | 2014-233536 | 12/2014 |

* cited by examiner

COMPUTER-READABLE NON-TRANSITORY STORAGE MEDIUM HAVING INFORMATION PROCESSING PROGRAM FOR STORING FOOTPRINT COORDINATE SETS IN ORDER OF TIME SERIES

CROSS REFERENCE TO RELATED APPLICATION

This application claims priority to Japanese Patent Application No. 2022-160681 filed on Oct. 5, 2022, the entire contents of which are incorporated herein by reference.

FIELD

The present disclosure relates to information processing in which a first object moves in a virtual space and at least one second object moves in accordance with movement of the first object.

BACKGROUND AND SUMMARY

Conventionally, there has been known a game in which a player character is followed by another follow-up character. Further, in such a game, there has been known a method in which, when the follow-up character is left behind the player character by, for example, being caught on an obstacle such as a terrain or the like, the follow-up character is moved to track a route (footprints) through which the player character passes.

In the above method, the follow-up character is caused to track a movement route of the player character which would be operated to move while avoiding an obstacle, and as a result, the follow-up character can be moved while avoiding the obstacle. However, since the follow-up character merely tracks the movement route of the player character, the follow-up character tracks extra motions that the player character has performed, as well. Then, as the follow-up character tracks even extra motions, it takes time for the follow-up character to catch up with the player character, and also, regarding the appearance of the way in which the follow-up character moves, the motion might appear unnatural.

Accordingly, an object of the present disclosure is to provide an information processing program, an information processing system, and an information processing method that, in information processing of performing movement control of a predetermined character so as to follow a player character, can move the predetermined character to a position near the player character, with a motion that is natural also in appearance, and within a shorter time.

Configuration examples for achieving the above object will be shown below.

(Configuration 1)

A configuration 1 is a computer-readable non-transitory storage medium having stored therein an information processing program for causing a computer of an information processing apparatus to execute information processing in which a first object moves in a virtual space and at least one second object moves in accordance with movement of the first object, the program causing the computer to: perform movement control of the first object to a first object coordinate set which is a coordinate set in the virtual space, on the basis of an operation input; along with the movement control of the first object, repeatedly acquire footprint coordinate sets which are coordinate sets based on the first object coordinate set, a plurality of times, and store the footprint coordinate sets in an order of time series; for a first footprint coordinate set among the acquired plurality of footprint coordinate sets, determine whether or not a path connecting the first footprint coordinate set and a second footprint coordinate set stored later in time series than the first footprint coordinate set is passable, and if the path is determined to be passable, store information specifying the path in association with the first footprint coordinate set; and perform movement control of the second object so as to track the acquired footprint coordinate sets in time series, and further, on a predetermined footprint coordinate set, if there is the path determined to be passable, perform movement control of the second object so as to pass through the path.

According to the above configuration, a movement trajectory of the first object is stored as footprints. In addition, the second object is moved so as to track the movement trajectory of the first object. Then, while the second object is tracking the movement trajectory, if there is a passable path from a given footprint to another footprint, the second object can be moved using the path. Thus, in information processing in which the second object moves while following the first object, it is possible to shorten a time taken for the second object to catch up with the first object, while causing the second object to perform a natural behavior.

(Configuration 2)

In a configuration 2 based on the above configuration 1, whether or not a straight path connecting the first and second footprint coordinate sets is passable may be determined.

According to the above configuration, whether or not a straight path is available as a shortcut path is determined. Then, at the time of using the path, movement is performed straightly, whereby the movement time can be further shortened.

(Configuration 3)

In a configuration 3 based on the above configuration 1 or 2, if there are a plurality of the second footprint coordinate sets to which the paths are determined to be passable from the first footprint coordinate set, information specifying the path to the latest second footprint coordinate set in time series may be stored in association with the first footprint coordinate set.

According to the above configuration, in a case where, at a given footprint, a plurality of paths to other footprints are found, the path to the footprint closer to the first object can be used. Thus, the time taken to catch up with the first object can be further shortened.

(Configuration 4)

In a configuration 4 based on the above configuration 3, in every predetermined number of frames, whether or not the paths connecting each of a plurality of first footprint coordinate sets and a predetermined number of the second footprint coordinate sets are passable may be determined.

(Configuration 5)

In a configuration 5 based on the above configuration 4, the predetermined numbers may be changed in accordance with a processing load.

According to the above configuration, processing for determination for the path can be executed more efficiently in accordance with the processing load at each time.

(Configuration 6)

In a configuration 6 based on the above configuration 1, the information processing program may further cause the computer to: perform follow-up movement control of the second object so as to move toward a movement goal coordinate set based on the first object coordinate set; detect whether the second object is unable to reach the movement goal coordinate set during the follow-up movement control; if it is detected that the second object is unable to reach the movement goal coordinate set, perform movement control of the second object so as to move toward one of the footprint coordinate sets; and after the second object has reached the one of the footprint coordinate sets through the movement control, perform movement control of the second object so as to track the footprint coordinate sets in time series.

According to the above configuration, normally, the second object is controlled to perform follow-up movement of directly heading toward the first object, and in a case where advancement of the second object is hampered by an obstacle or the like during the follow-up movement, the second object is moved so as to trace the movement route of the first object operated by a user so as to avoid the obstacle. Thus, even if the advancement is hampered, it is possible to move the second object to a position near the first object while taking such a path as to avoid an obstacle or the like.

(Configuration 7)

In a configuration 7 based on the above configuration 6, if a coordinate set of the second object has not changed for a predetermined period or longer or if it is detected that the second object has continued colliding with an obstacle object for a predetermined period or longer, the second object may be determined to be unable to reach the movement goal coordinate set.

(Configuration 8)

In a configuration 8 based on the above configuration 6, if it is detected that the second object is unable to reach the movement goal coordinate set, the second object may be subjected to movement control so as to move toward a latest footprint coordinate set present in a predetermined range from a coordinate set of the second object.

According to the above configuration, the latest footprint among footprints present in a predetermined range is selected, whereby the second object can be moved so as to track the movement route of the first object while using, as a base point, a footprint closer to the first object. Thus, a time taken to catch up with the first object can be further shortened.

(Configuration 9)

In a configuration 9 based on the above configuration 1, among the acquired plurality of footprint coordinate sets, a footprint coordinate set stored last and a footprint coordinate set stored one-set before the last may be not used as the first footprint coordinate sets and also may be not subjected to determination as to whether or not the path to the second footprint coordinate set is passable.

According to the above configuration, processing for footprints on which the paths need not be searched for can be omitted. Thus, the processing load can be reduced.

According to the exemplary embodiment, in a case of moving the second object so as to follow the first object, a scene in which the second object moves with a natural behavior can be represented, and a time taken for the second object to catch up with the first object can be shortened.

DETAILED DESCRIPTION OF NON-LIMITING EXAMPLE EMBODIMENTS

Hereinafter, one exemplary embodiment will be described.

First, a game system according to an example of the exemplary embodiment will be described. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
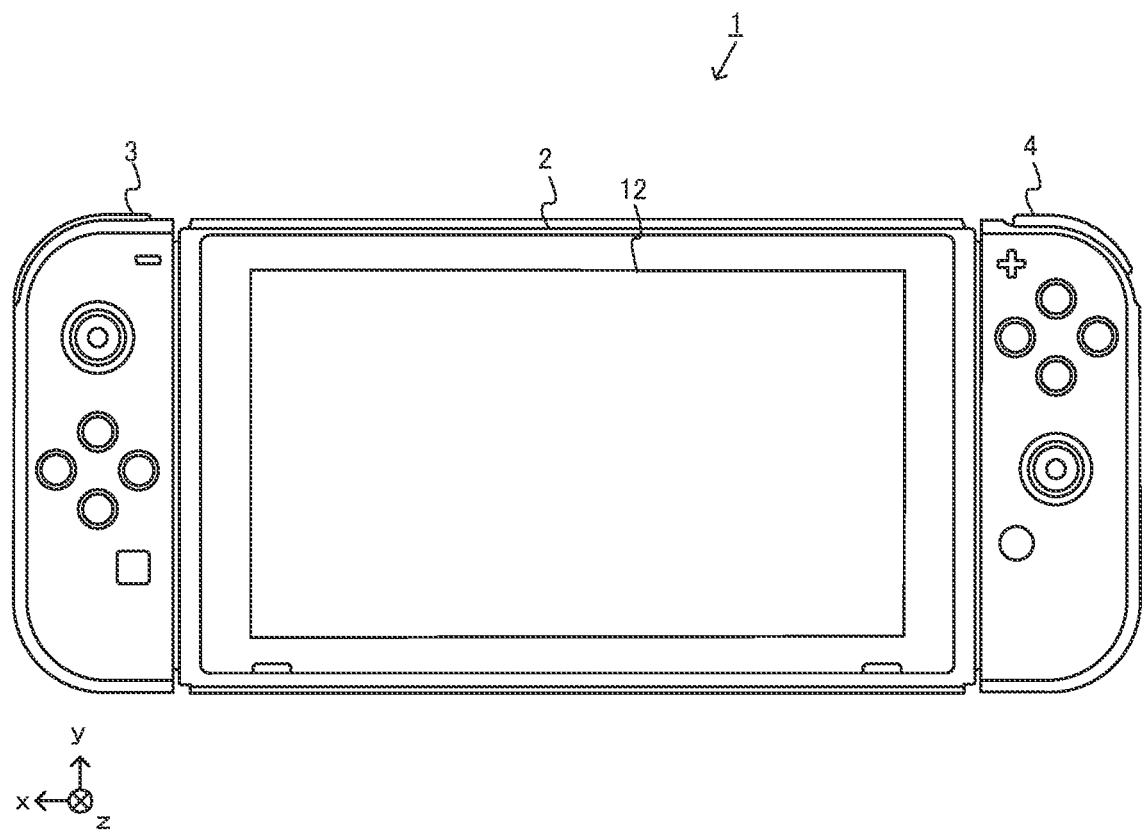
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
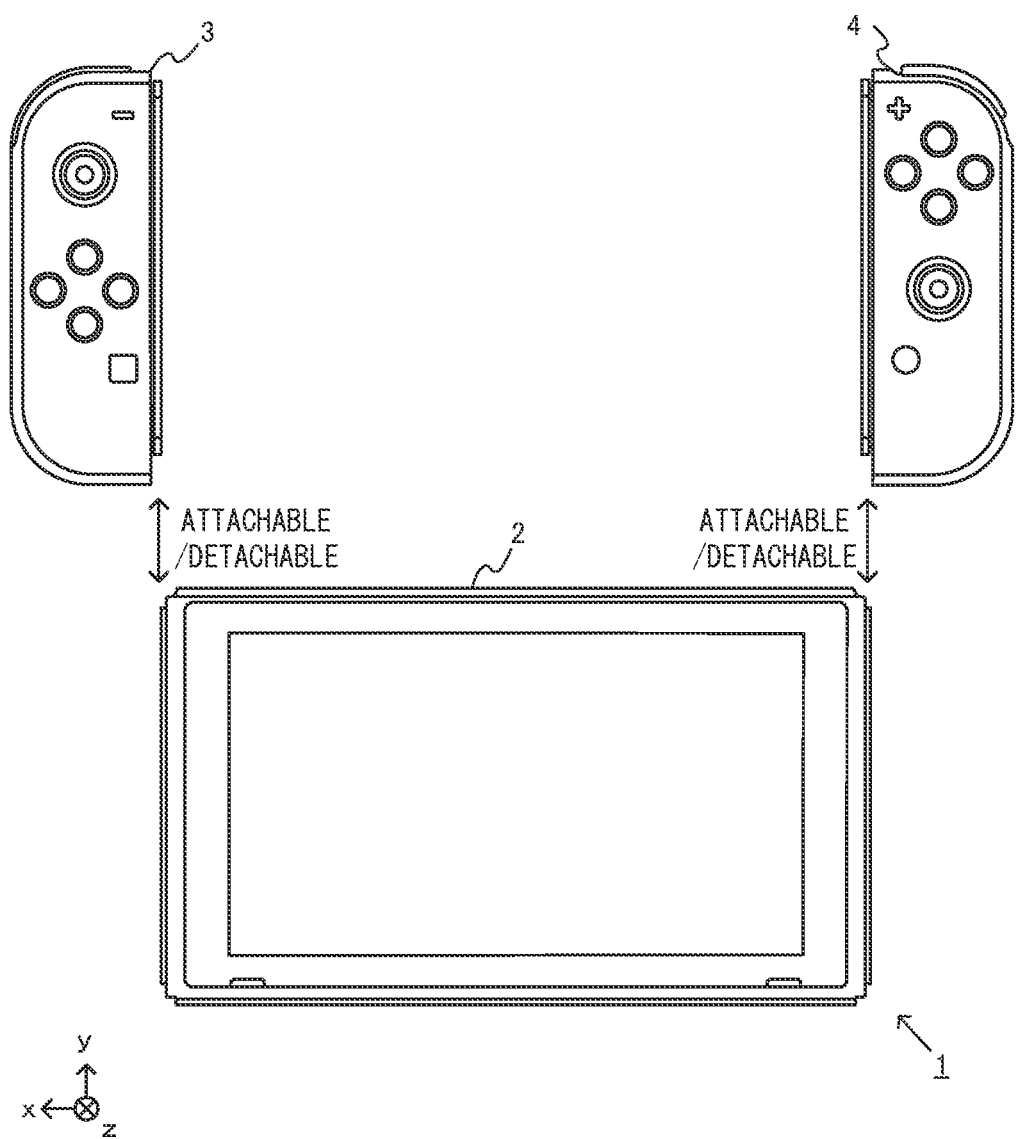
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

Figure 3:
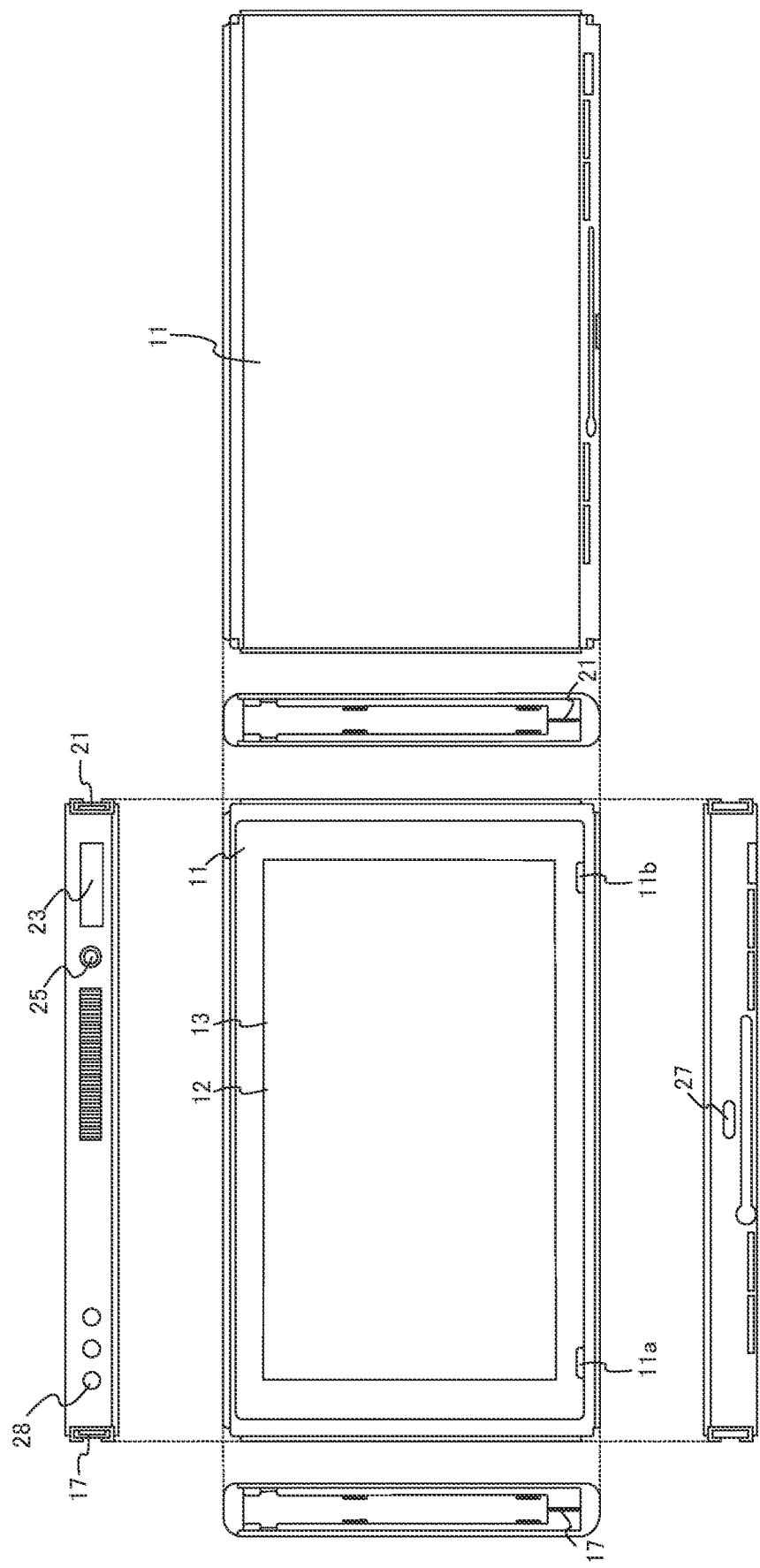
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed in the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
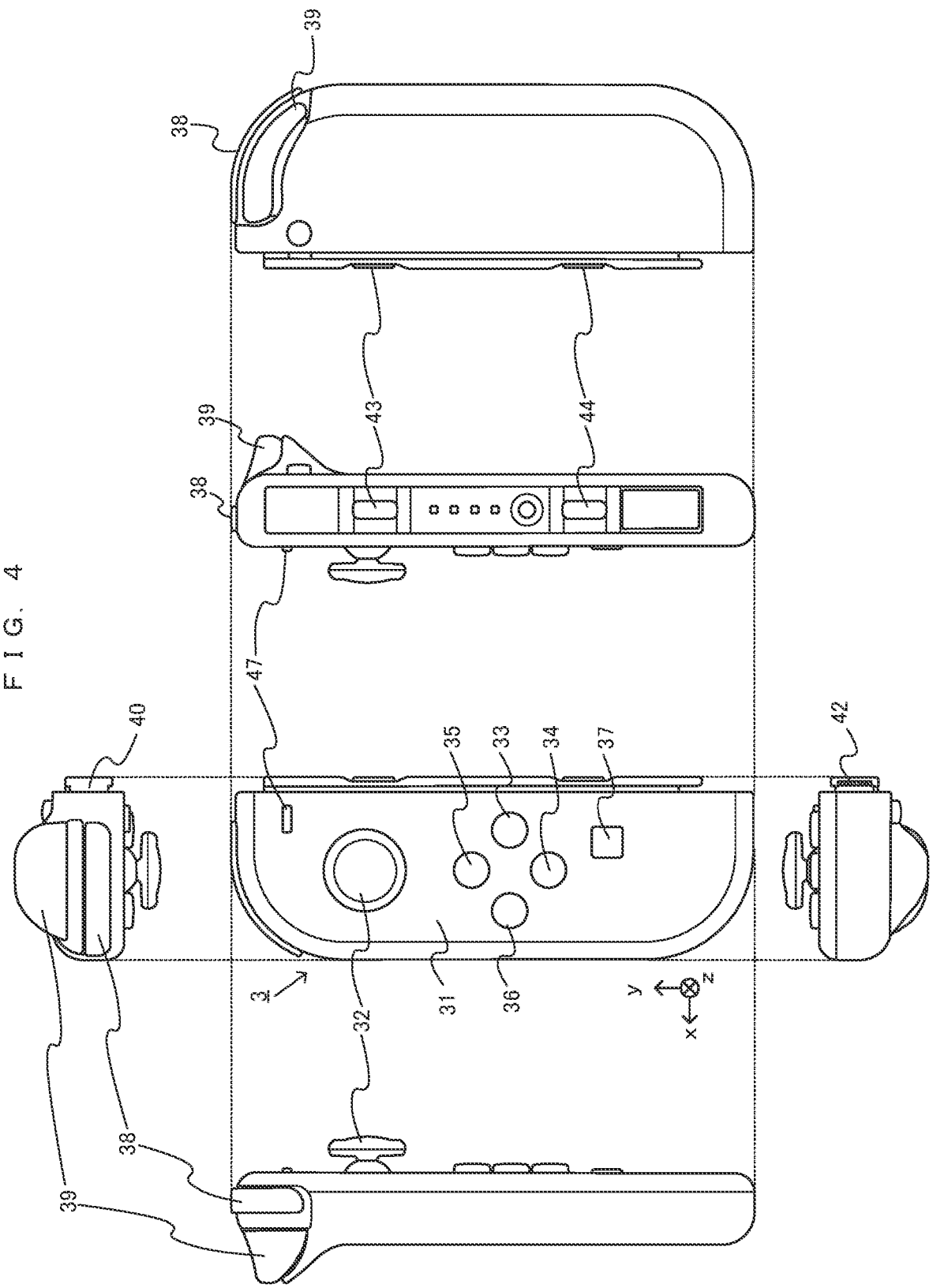
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
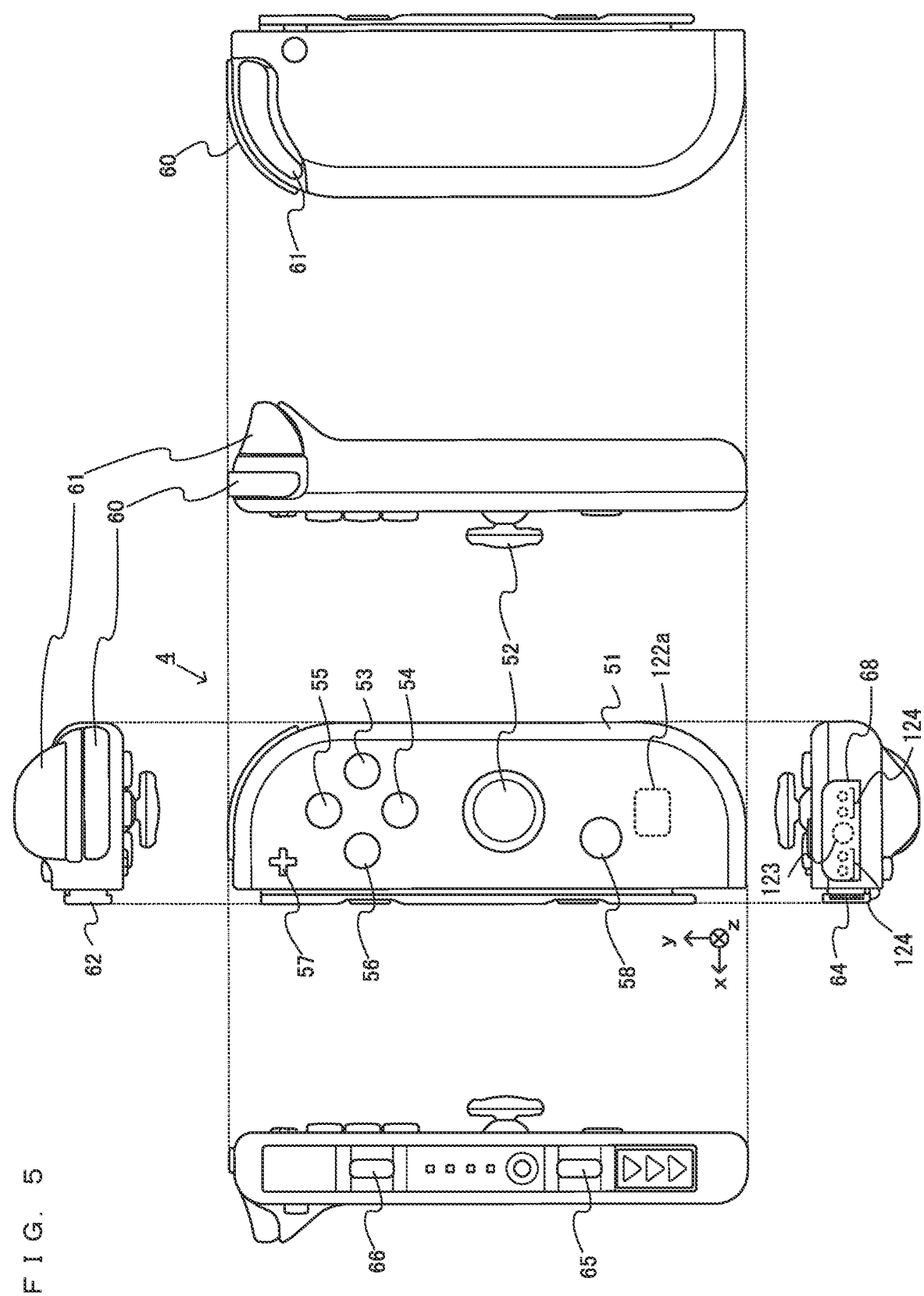
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
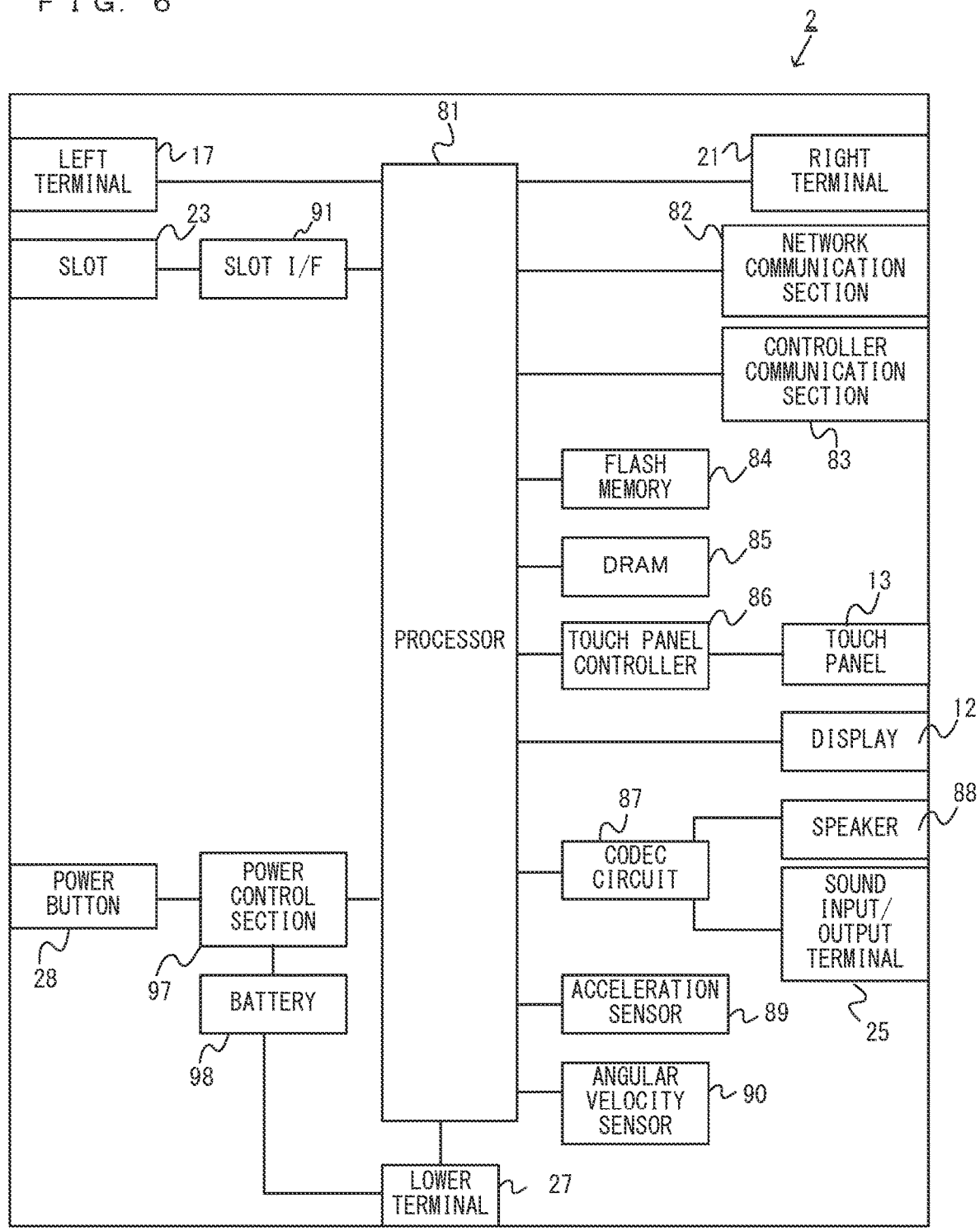
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
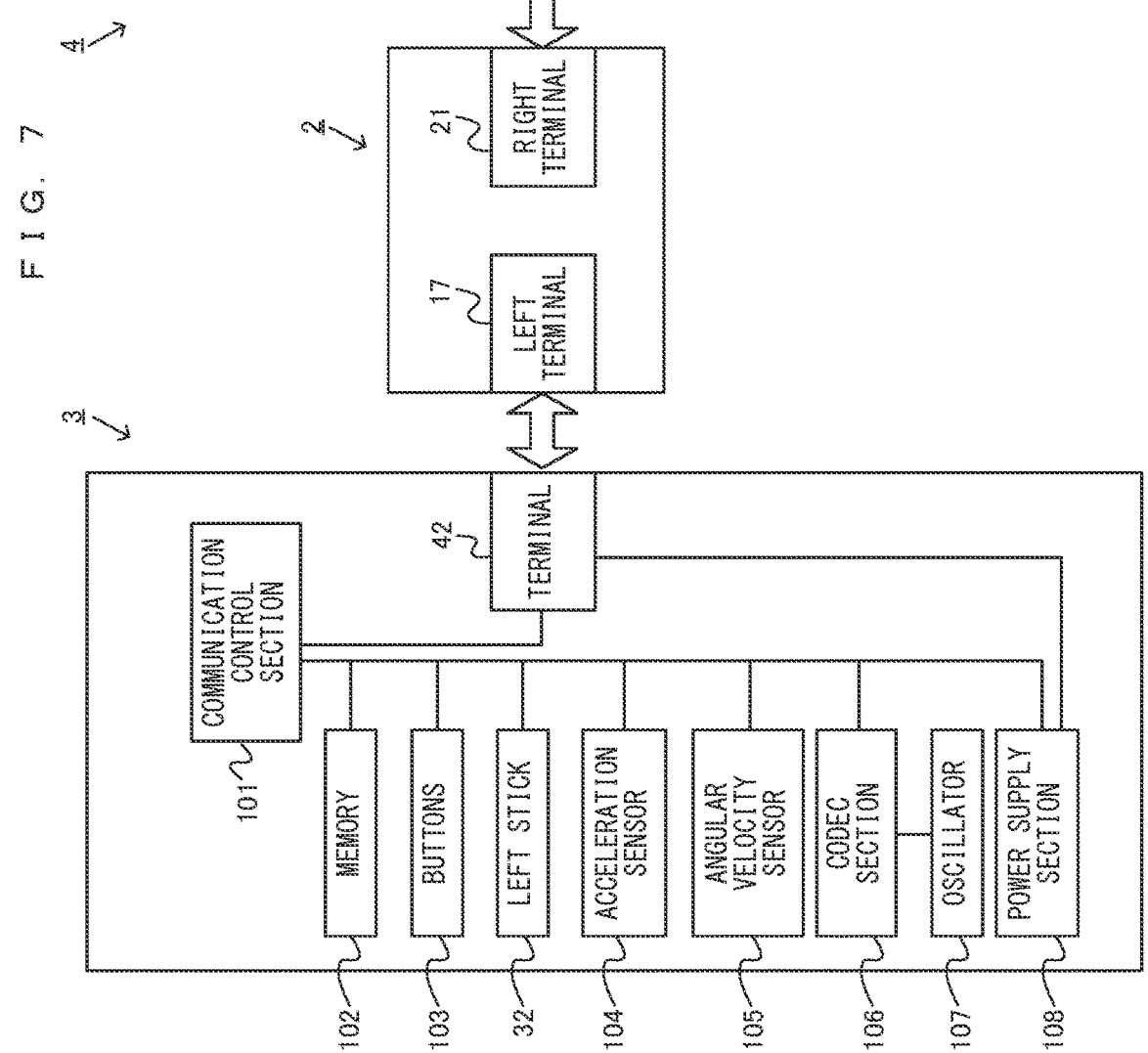
FIG. 7 is a block diagram showing a non-limiting example of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Outline of Game Processing in Exemplary Embodiment

Next, the outline of operation in game processing executed in the game system 1 according to the exemplary embodiment will be described. In a game executed in the exemplary embodiment, the user plays by moving a character in a virtual game space using the above controller. In the game space, not only a character (hereinafter, referred to as a leader character) that the user operates but also a plurality of characters (hereinafter, referred to as sub characters) subjected to movement control on the basis of a predetermined algorithm by the processor 81 are present. The plurality of sub characters are subjected to movement control so as to follow the leader character while forming a predetermined troop.

Figure 8:
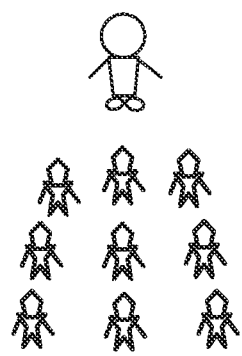
FIG. 8 is a schematic view showing a non-limiting example of a troop in the exemplary embodiment.
Figure 9:
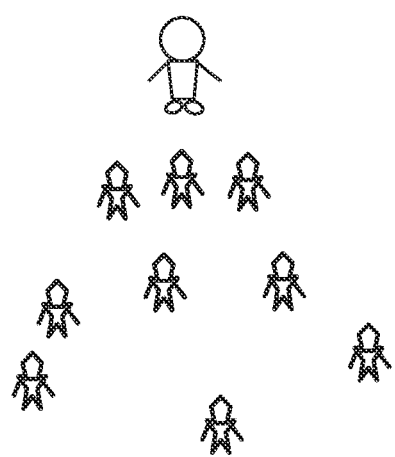
FIG. 9 is a schematic view showing a non-limiting example of a troop in the exemplary embodiment.

FIG. 8 shows a scene in which the leader character and a plurality of sub characters following the leader character move while forming a troop. However, in actuality, the characters do not move while forming such a well-arranged troop as shown in FIG. 8, and as each sub character is subjected to movement control individually, the troop can have a form as shown in FIG. 9 due to differences in movement speeds of the sub characters, the effects of terrain, and the like. When a sufficient time has elapsed since the leader character stopped movement, the sub characters basically come to stop at positions as shown in FIG. 8.

[Movements of Sub Characters]

Next, movement control of the above sub characters will be described. In the exemplary embodiment, the sub characters basically move while heading toward the positions of "slots" determined on the basis of the position and the orientation of the leader character. However, during movement, if a sub character is caught on a terrain, the sub character is controlled to move toward the position of the leader character while tracking "footprints" of the leader character. Hereinafter, the outline of movement control (slot mode) using the "slots" and movement control (footprint follow-up mode) using the "footprints" will be described.

[Movement Control Based on Slots]

First, the outline of the movement control in the slot mode will be described. In the exemplary embodiment, a plurality of movement goal points are set as the slots, in the game space. Then, one slot is associated with each sub character, and each sub character is moved toward the corresponding slot. Each slot is set in the vicinity of the position of the leader character, using the position and the orientation of the leader character as a reference. For example, slots are arranged on a side opposite to the orientation (advancement direction) of the leader character. In addition, when the leader character moves or changes its direction (or changes its orientation) in the game space, the coordinates of each slot are also changed accordingly. Thus, when the leader character moves, each slot also moves accordingly.

Next, the relationship between the slots and the sub characters will be described. Each sub character is associated with a slot number serving as a movement goal point, individually. For example, a sub character number 1 is associated with a slot number 1, a sub character number 2 is associated with a slot number 2, and a sub character number 3 is associated with a slot number 3. As a result, as shown in FIG. 10, a sub character (hereinafter, simply referred to as a sub character 1) whose sub character number is 1 moves while heading toward the slot 1, the sub character 2 moves while heading toward the slot 2, and the sub character 3 moves while heading toward the slot 3.

Figure 10:
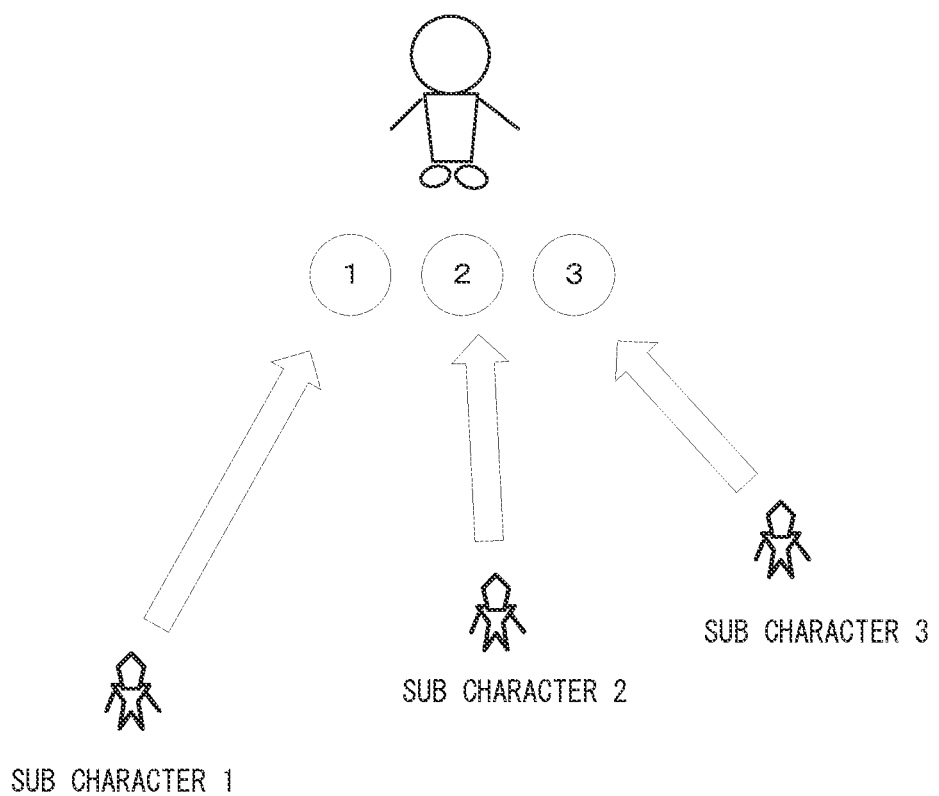
FIG. 10 illustrates a non-limiting example of the relationship between slots and sub characters.

In the example in FIG. 10, the character numbers are equal to the slot numbers, but this is merely an example and the corresponding relationship may be arbitrarily set.

As described above, each sub character moves while heading toward the slot associated with itself, whereby the sub characters move in the game space while forming a predetermined troop and following the leader character.

[Movement Control Based on Footprints]

Figure 11:
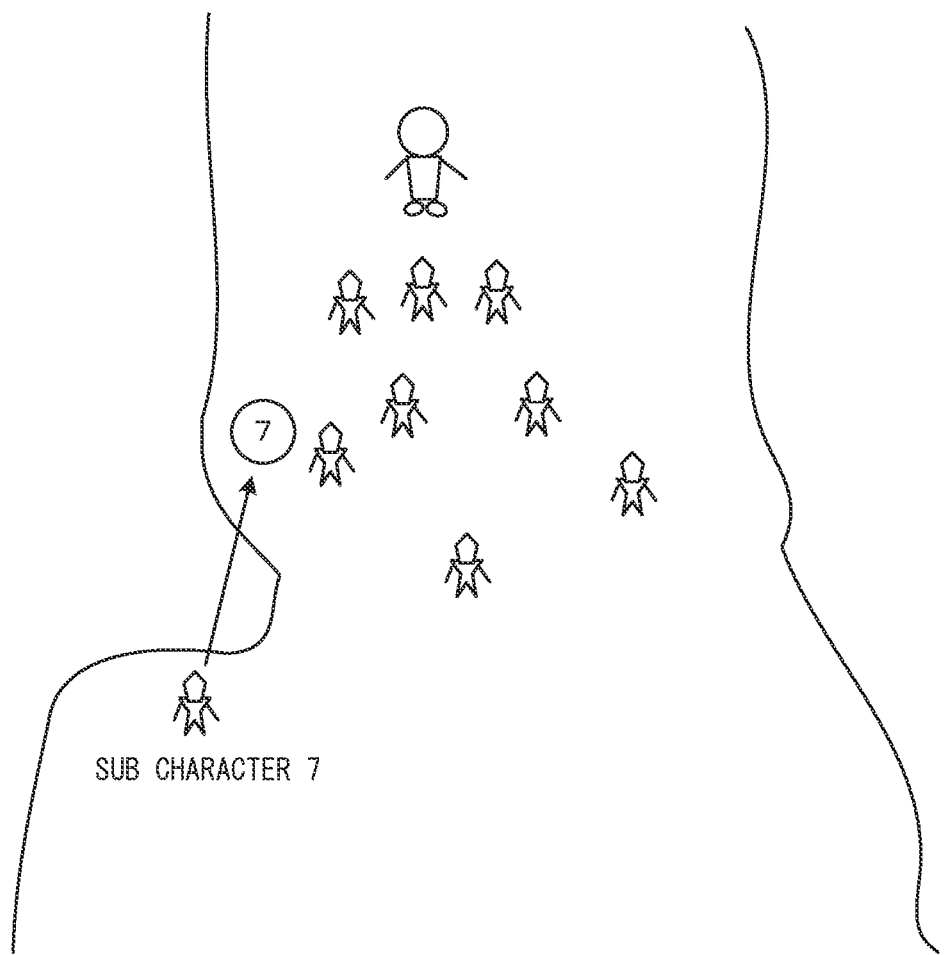
FIG. 11 illustrates a non-limiting example of movement control based on footprints.

Next, the outline of the movement control in the footprint follow-up mode will be described. While the sub characters are moving in the game space through the movement control in the above slot mode, as shown in FIG. 11, advancement of a sub character might be hampered by an obstacle such as a wall. In the example in FIG. 11, a sub character 7 attempts to move while heading toward a slot 7, but since there is an obstacle (terrain) between the sub character 7 and the slot 7, the sub character 7 cannot follow the leader character. In a case where the sub character collides with an obstacle as described above, in the exemplary embodiment, the sub character is stopped from moving in the direction toward the slot and movement of the sub character is controlled so as to track a trajectory through which the leader character has passed. This is because an advancement course of the sub character is not blocked by an obstacle as long as the sub character tracks the trajectory of the leader character.

In the exemplary embodiment, the trajectory through which the leader character has passed is managed as "footprints". Specifically, the present position (coordinates in a spatial coordinate system) of the leader character is sequentially accumulated as "footprints" of the leader character, at predetermined timings. More specifically, for example, a footprint is stored at a timing of once per predetermined number of frames (e.g., once per 10 frames). Data (hereinafter, referred to as footprint data) stored at this time includes a timestamp for that time and the coordinates of the leader character.

In the exemplary embodiment, at the time when 10 frames have passed since a footprint was stored at the previous time, if the leader character has not been away from that footprint by a certain distance or longer, a new footprint is not stored. Thus, footprint data that are not meaningful very much can be prevented from being accumulated, and the storage area can be effectively utilized. Since it is impossible to infinitely accumulate footprint data, footprint data older by a certain period or longer needs to be deleted from the storage area. For example, when the number of the accumulated footprint data has become a certain number or larger, the footprint data that is the oldest (i.e., corresponds to the smallest frame number) in the accumulated footprint data may be deleted from the storage area when new footprint data is stored. Hereinafter, each footprint accumulated as the footprint data is referred to as a "footprint Ni". Here, i is a positive integer and increases in the order from the oldest footprint in time series. For example, in a case where there are five footprints accumulated, they are referred to as a footprint N1, a footprint N2, . . . , a footprint N5, in the order from the oldest one in time series.

Figure 12:
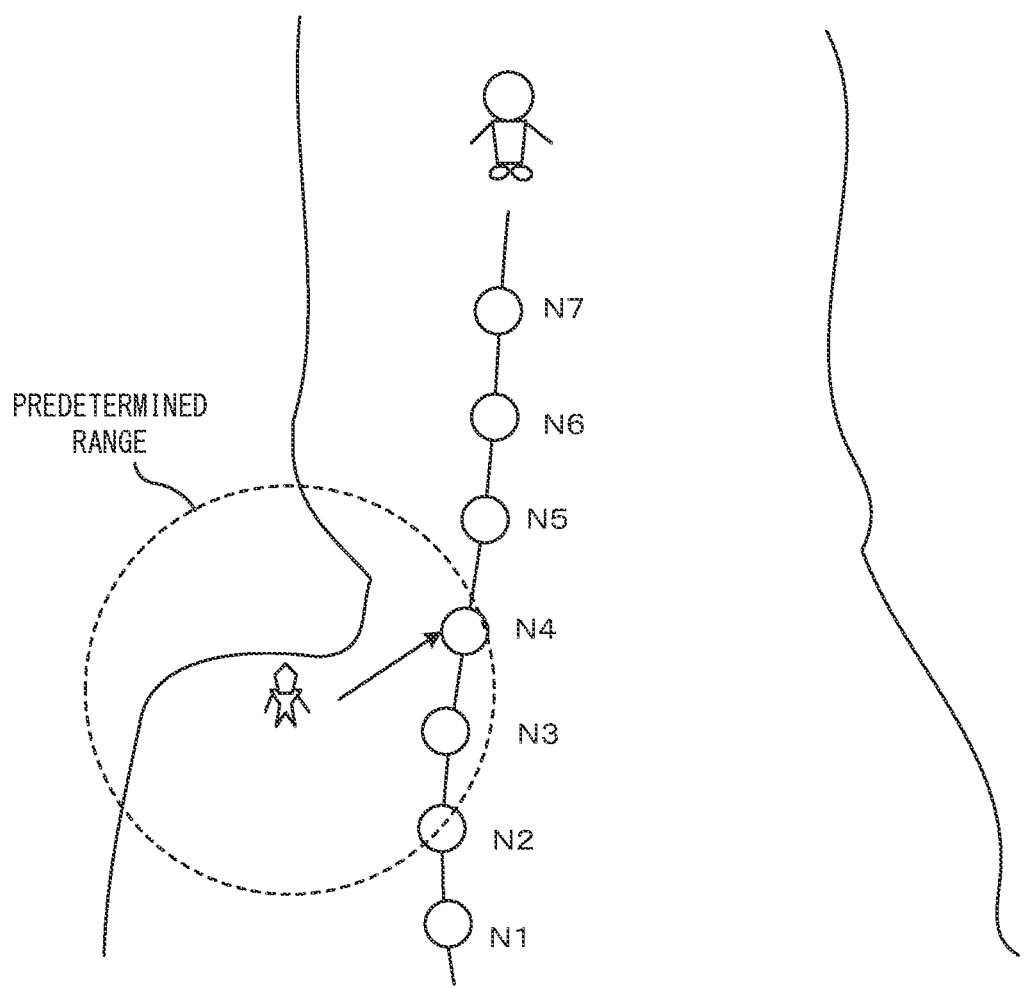
FIG. 12 illustrates a non-limiting example of movement control based on footprints.

When an advancement course of a sub character is blocked by an obstacle as described above, the newest one of footprints present in a predetermined range around the sub character is set as a movement goal to which the sub character whose advancement course is blocked is to move. For example, as shown in FIG. 12, when the sub character 7 collides with a wall, the movement goal is changed to the footprint N4 which is the newest footprint among the footprints N2, N3, N4 present in a predetermined range.

Figure 13:
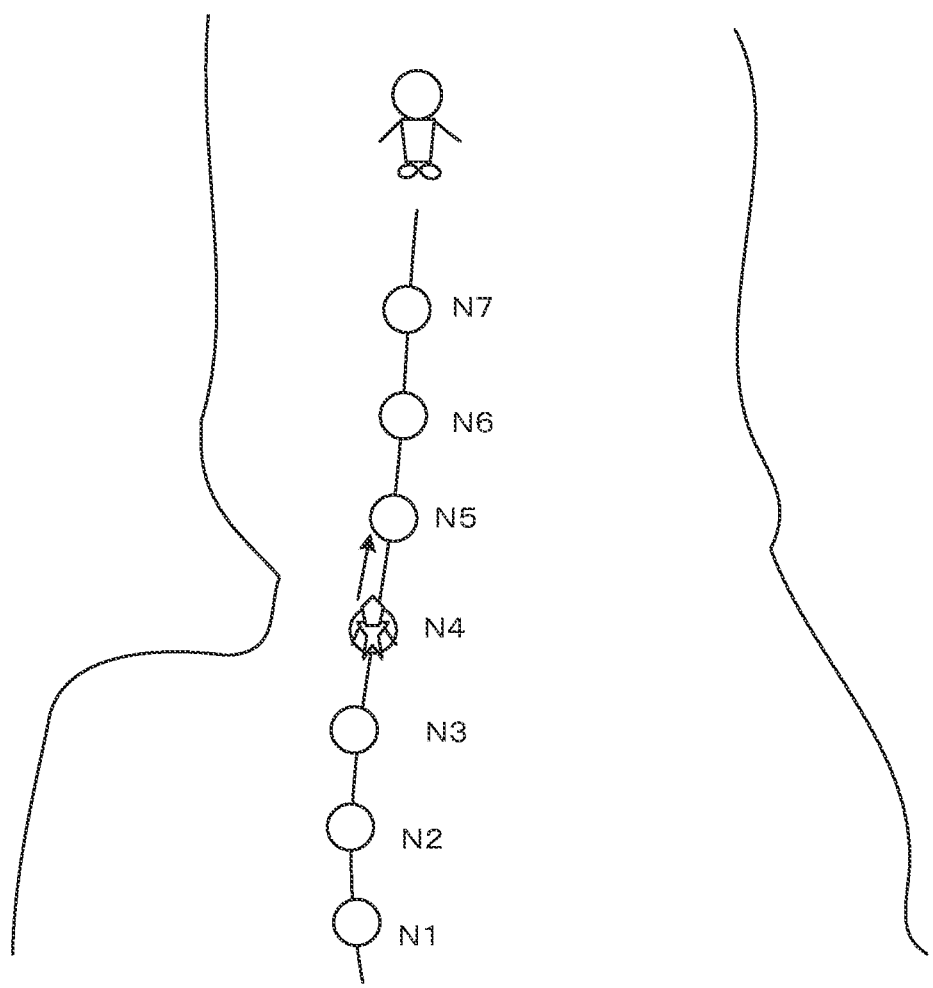
FIG. 13 illustrates a non-limiting example of movement control based on footprints.

Thereafter, when the sub character 7 has reached the footprint at the movement goal, the movement goal is changed to a newer footprint than that footprint. In the example in FIG. 12, when the sub character 7 has reached the footprint N4, the movement goal of the sub character 7 is changed to the footprint N5 as shown in FIG. 13. Further, when the sub character 7 has reached the footprint N5, the movement goal of the sub character 7 is changed to the footprint N6. By repeating this, the sub character 7 can track the movement trajectory of the leader character and follow the leader character.

While the sub character is tracking the movement trajectory of the leader character (i.e., tracking the footprints), determination as to a distance between the present coordinates of the sub character and the coordinates of the slot corresponding to the sub character is performed. Then, when the sub character has reached a position within a certain distance from the corresponding slot, the movement goal of the sub character is changed from the footprint to the slot. That is, the movement control is switched from the footprint follow-up mode to the slot mode. Thus, each sub character can eventually move while heading toward the slot associated with itself and follow the leader character while taking the original position.

[Shortcut Movement Control]

In the footprint follow-up mode, through the movement control for tracking footprints as described above, the advancement course is prevented from being hampered by an obstacle, but meanwhile, if the leader character has performed an extra motion (e.g., a movement trajectory taking a roundabout way), footprints corresponding to the extra motion are also tracked as they are. Therefore, it takes time to catch up with the leader character. In addition, in terms of the appearance and the visual impression in movement of the sub character, the motion of the sub character tracking the footprints of the leader character might appear to be an unnatural motion, depending on the situation. Considering this, in the exemplary embodiment, the following control is further performed. That is, when the sub character has reached a footprint, whether or not there is a shortcut from the footprint to another footprint closer to the present position of the leader character is determined. Then, if there is a shortcut to such another footprint, the movement goal is changed to the shortcut destination.

Figure 14:
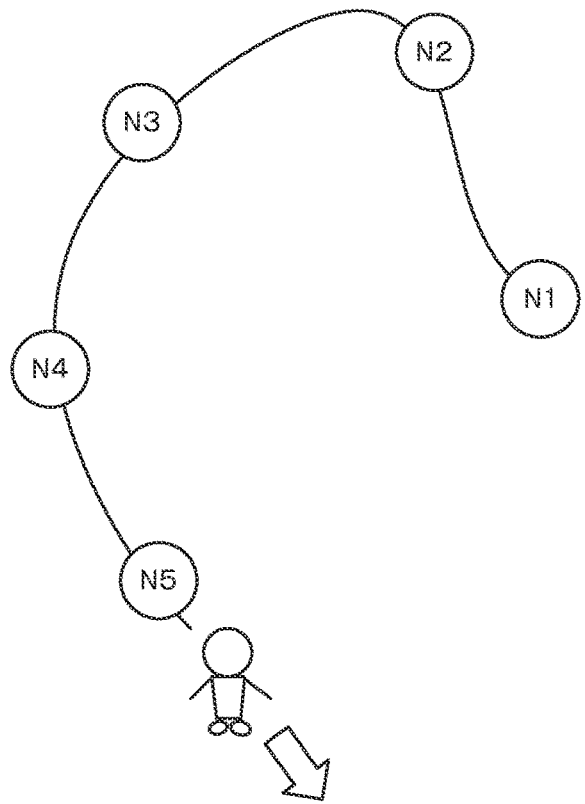
FIG. 14 illustrates a non-limiting example of shortcut control.

The outline of the above control using the shortcut will be described. Here, as an example, it is assumed that five footprints as shown in FIG. 14 are present as accumulated footprints. In FIG. 14, footprints N1 to N5 are shown in the order from the oldest one in time series. In the exemplary embodiment, for each footprint, a shortcut that can be passed along a straight path and leads to the footprint closest to the leader character among the footprints later in time series than said each footprint, is calculated, and information on the shortcut is stored in association with the footprint. Specifically, in the order from the oldest footprint in time series, processing (hereinafter, ray cast) of casting a line (ray) from the footprint to each of other footprints newer than that footprint in time series is performed. If the ray reaches the other footprint without colliding with any obstacle on the way, the ray cast is determined to be successful (the shortcut can be passed), and otherwise, the ray cast is determined to have failed (the shortcut cannot be passed). Then, among the other footprints for which ray casts have succeeded, information on the shortcut to the latest footprint is stored. Here, in the exemplary embodiment, in calculation of such shortcuts, a ray cast to a footprint that is adjacent in time series (a footprint located at the next position in time series) is omitted. This is because it is meaningless to calculate a shortcut for such a footprint.

Figure 15:
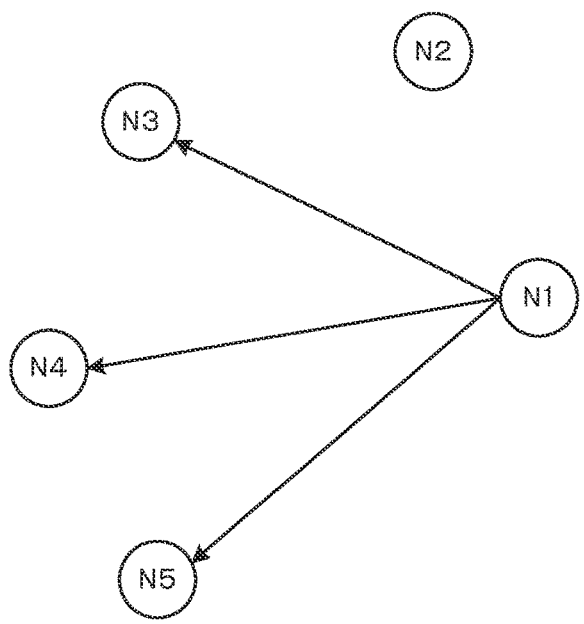
FIG. 15 illustrates a non-limiting example of shortcut control.
Figure 16:
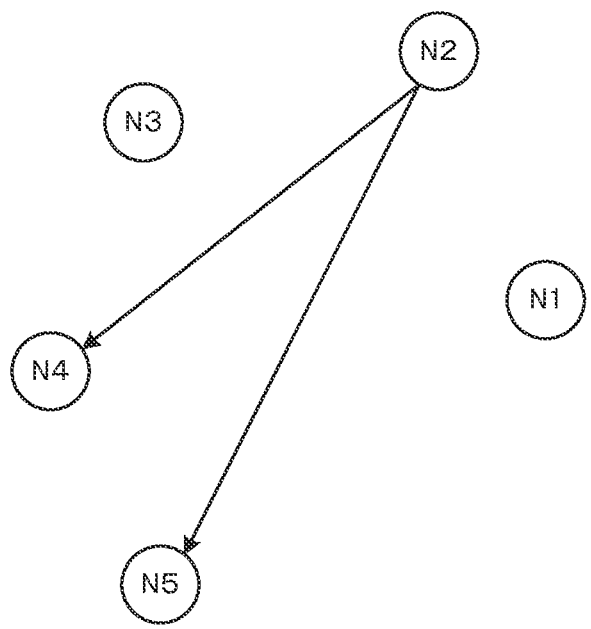
FIG. 16 illustrates a non-limiting example of shortcut control.
Figure 17:
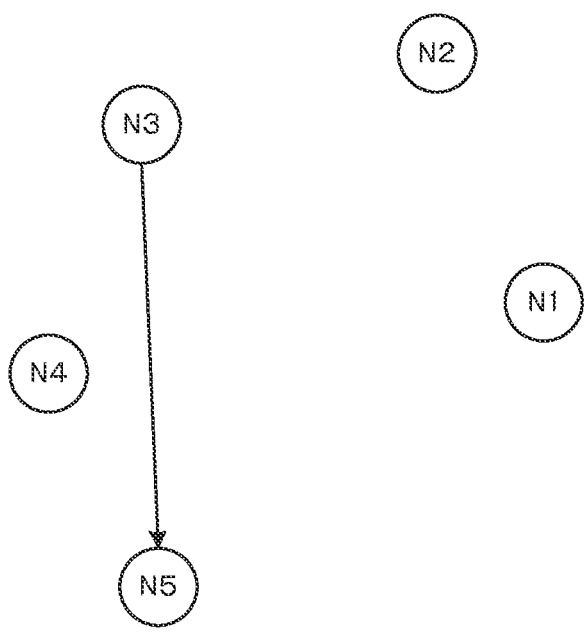
FIG. 17 illustrates a non-limiting example of shortcut control.

FIG. 15 to FIG. 17 show examples of shortcut calculation. FIG. 15 shows an example of shortcut calculation in a case of using the footprint N1 in FIG. 14 as a reference. In this case, execution of a ray cast is omitted for the footprint N2 which is next to the footprint N1, and ray casts are performed from the footprint N1 to the footprint N3, from the footprint N1 to the footprint N4, and from the footprint N1 to the footprint N5. As a result, all the ray casts succeed, and among these, information indicating a shortcut to the footprint N5 closest to the leader character is eventually stored in association with the footprint N1.

FIG. 16 shows an example of shortcut calculation in a case of using the footprint N2 as a reference. In this case, execution of a ray cast is omitted for the footprint N3 which is next to the footprint N2. Then, ray casts are performed from the footprint N2 to the footprint N4 and from the footprint N2 to the footprint N5. As a result, all the ray casts succeed, and among these, information indicating a shortcut to the footprint N5 closest to the leader character is stored in association with the footprint N2.

FIG. 17 shows an example of shortcut calculation in a case of using the footprint N3 as a reference. In this case, execution of a ray cast is omitted for the footprint N4 which is next to the footprint N3. As a result, only a ray cast from the footprint N3 to the footprint N5 is performed. Then, if the ray cast has succeeded, information indicating a shortcut to the footprint N5 is stored in association with the footprint N3.

Since the footprints N4 and N5 are adjacent to each other, it is meaningless to calculate a shortcut therebetween. Therefore, shortcut calculation in a case of using N4 as a reference is not needed. In addition, N5 is the latest footprint, in the first place, and therefore there are no destinations to which a shortcut is to be made. As a result, in the examples in FIG. 14 to FIG. 17, only the footprints N1 to N3 are processing targets for which shortcuts are to be calculated.

As described above, on each footprint, whether or not there is a shortcut is determined, and if there is such a shortcut, information on the footprint at the shortcut destination is stored. Then, while the sub character is moving while tracking footprints, if the sub character has reached a footprint having a shortcut, the next movement goal is set to be a footprint at the shortcut destination. That is, movement to take a shortcut is performed without tracking footprints. On the other hand, if there is no shortcut on the reached footprint, the next new footprint in time series is set as a movement goal. That is, in this case, movement to track footprints continues.

Figure 18:
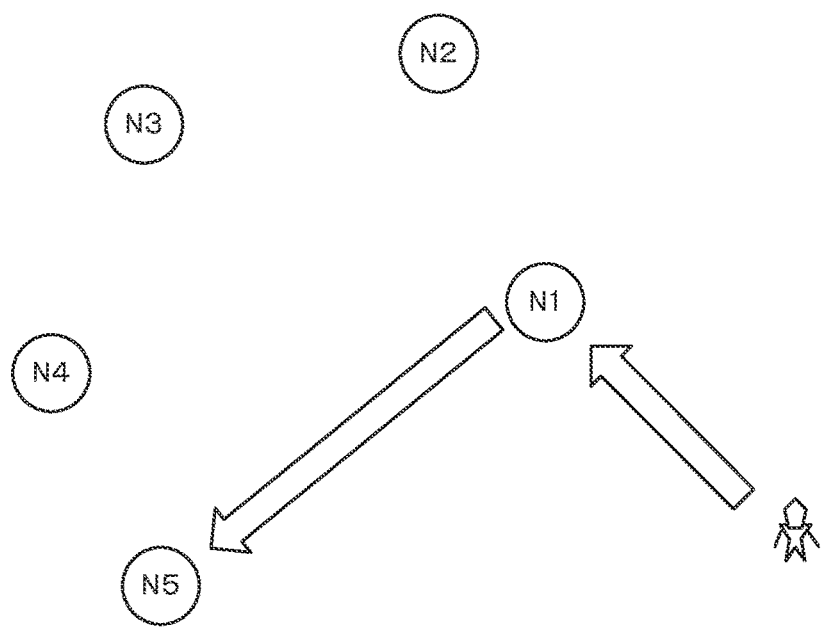
FIG. 18 illustrates a non-limiting example of shortcut control.
Figure 19:
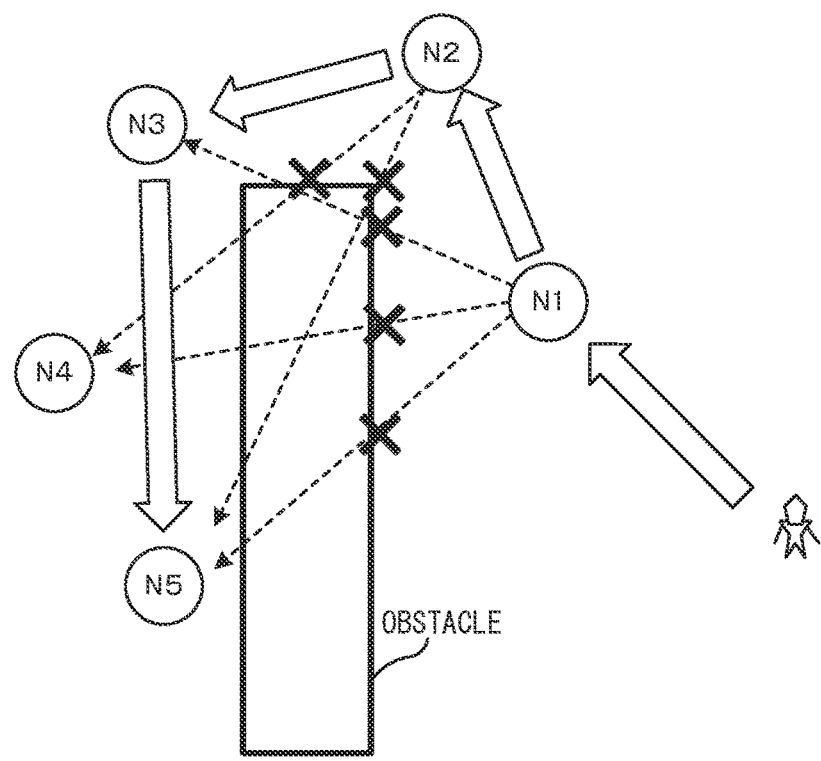
FIG. 19 illustrates a non-limiting example of shortcut control.

On the basis of the shortcut calculation examples shown in FIG. 14 to FIG. 17, examples of movement routes of a sub character using a shortcut are shown in FIG. 18 and FIG. 19. FIG. 18 shows an example in which there are no obstacles, and FIG. 19 shows an example in which there is an obstacle. In the case of FIG. 18, shortcut information to the footprint N5 is stored for the footprint N1. Therefore, when the sub character has reached the footprint N1, the next movement goal is set to be the footprint N5. As a result, a movement route of the sub character becomes a path extending from the footprint N1 to the footprint N5. On the other hand, in the case of FIG. 19 where there is an obstacle, on each of the footprints N1 and N2, ray casts to other footprints have failed due to presence of the obstacle. That is, there is no information on shortcuts stored for the footprints N1 and N2. Meanwhile, for the footprint N3, shortcut information to the footprint N5 is stored. In this case, the movement route is as follows. After the sub character has reached the footprint N1, the sub character moves while tracking footprints through the footprint N2 to the footprint N3. Then, when the sub character has reached the footprint N3, the sub character moves to the footprint N5 on the basis of shortcut information stored for the footprint N3. That is, the movement route of the sub character becomes a movement route passing through the footprint N1, the footprint N2, the footprint N3, and then the footprint N5.

As described above, in the exemplary embodiment, the movement control of a sub character is performed using a slot and footprints, and in performing the movement control using footprints, the movement control using shortcuts is also performed. Thus, the sub character can catch up with the leader character more quickly. In addition, in terms of the appearance, a scene in which the sub character moves to (moves to catch up with) the position of the leader character by a more natural behavior can be represented.

Details of Game Processing in Exemplary Embodiment

Next, with reference to FIG. 20 to FIG. 27, the game processing in the exemplary embodiment will be described in more detail. Here, mainly, processing relevant to the movement control of the sub character as described above will be described, and the detailed description of other kinds of game processing is omitted.

[Used Data]

Figure 20:
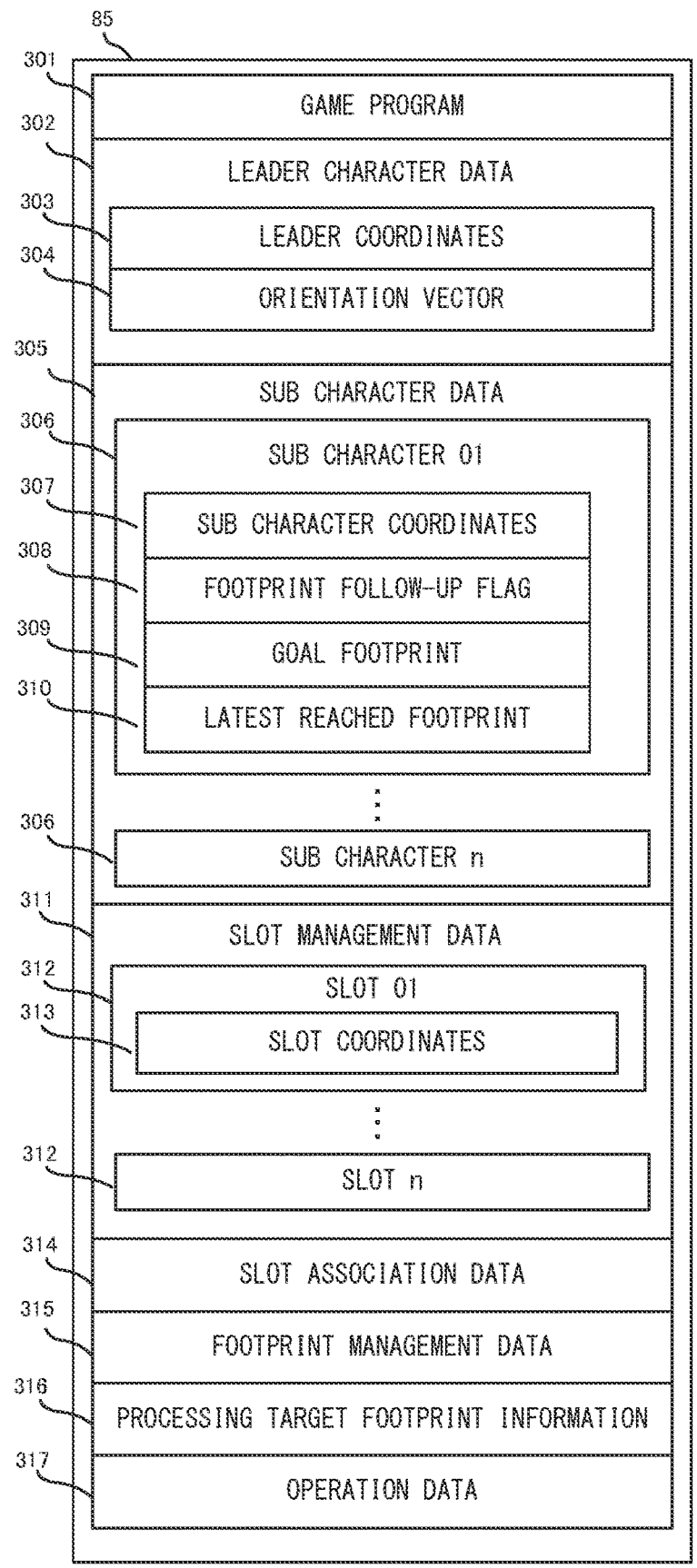
FIG. 20 is a memory map showing a non-limiting example of various data stored in a DRAM 85.

First, various data used in this game processing will be described. FIG. 20 is a memory map showing an example of various data stored in the DRAM 85 of the main body apparatus 2. The DRAM 85 of the main body apparatus 2 stores at least a game program 301, leader character data 302, sub character data 305, slot management data 311, slot association data 314, footprint management data 315, processing target footprint information 316, and operation data 317.

The game program 301 is a program for executing the game processing in the exemplary embodiment.

The leader character data 302 is data about the leader character. The leader character data 302 includes leader coordinates indicating the coordinates of the present position of the leader character, and an orientation vector of the leader character.

The sub character data 305 is data about the sub character. In the sub character data 305, sub character coordinates, a footprint follow-up flag, a goal footprint, and a latest reached footprint are stored for each sub character. The sub character coordinates are the coordinates of the present position of the sub character. The footprint follow-up flag is a flag for indicating whether the movement control of the sub character is control (slot movement mode) for moving while heading toward the slot or control (footprint follow-up mode) for moving while heading toward a predetermined footprint. If the footprint follow-up flag is ON, the control mode is the footprint follow-up mode, and if the footprint follow-up flag is OFF, the control mode is the slot movement mode. The goal footprint is information on the footprint that is the movement goal, and the latest reached footprint is information that specifies the latest footprint among the footprints that have already been reached.

The slot management data 311 is data for managing the slots described above. In the slot management data 311, slot coordinates are stored for each slot.

The slot association data 314 is data defining the correspondence relationship between slots and sub characters.

Figure 21:
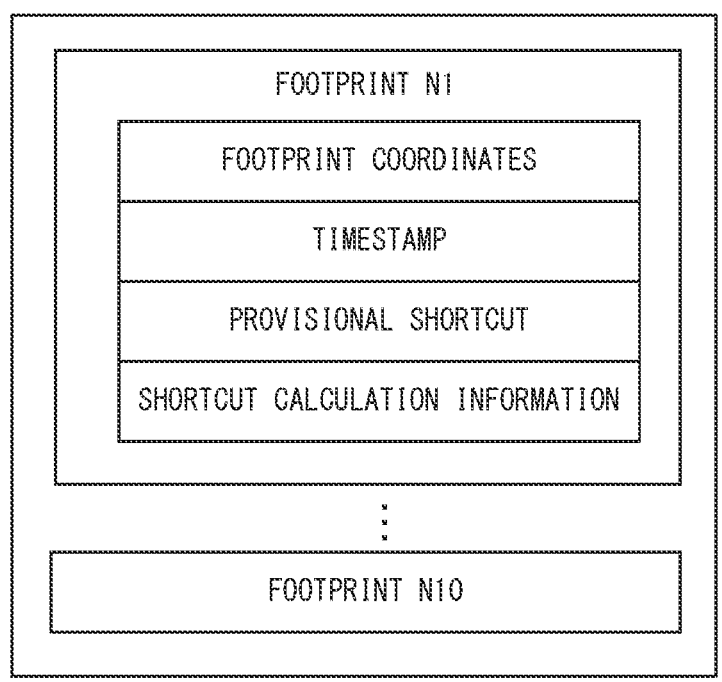
FIG. 21 shows a non-limiting example of the data structure of footprint management data.

The footprint management data 315 is data for managing the footprints described above. FIG. 21 shows an example of the data structure of the footprint management data 315. The footprint management data 315 is data with a list structure and includes a plurality of footprint data. In the exemplary embodiment, it is assumed that up to ten footprint data (footprint N1 to footprint N10) are stored as the footprint management data 315. As a matter of course, the number of footprint data to be stored is not limited thereto, and a larger number of footprint data may be stored. Each footprint data includes at least footprint coordinates, a timestamp, a provisional shortcut, and shortcut calculation information. The footprint coordinates are the coordinates of the footprint in the virtual space. The timestamp is information indicating the date and time when the footprint was stored. Instead of the timestamp, a frame number may be used. The provisional shortcut and the shortcut calculation information are working data used in a shortcut generation process described later. The shortcut calculation information is information indicating the last footprint to which a ray cast has been executed from a given footprint, and the provisional shortcut is information indicating the latest footprint among footprints for which ray casts have succeeded.

Returning to FIG. 20, next, the processing target footprint information 316 is information indicating a footprint Ni that is a processing target at the present frame in the shortcut generation process described later. More specifically, the processing target footprint information 316 is information for specifying a footprint as a base from which a ray is cast in executing the ray cast. As an initial value, a "footprint N1" is set.

The operation data 317 is data obtained from the controller operated by the user. That is, the operation data 317 is data indicating the content of operation performed by the user.

[Details of Processing Executed by Processor 81]

Next, the details of the game processing in the exemplary embodiment will be described. In the exemplary embodiment, one or more processors read and execute the program stored in one or more memories, to implement flowcharts shown below. The flowcharts are merely an example of a processing procedure. Therefore, the processing order of steps may be changed as long as the same result is obtained. In addition, values of variables and thresholds used in determination steps are merely examples, and other values may be used as necessary.

Figure 22:
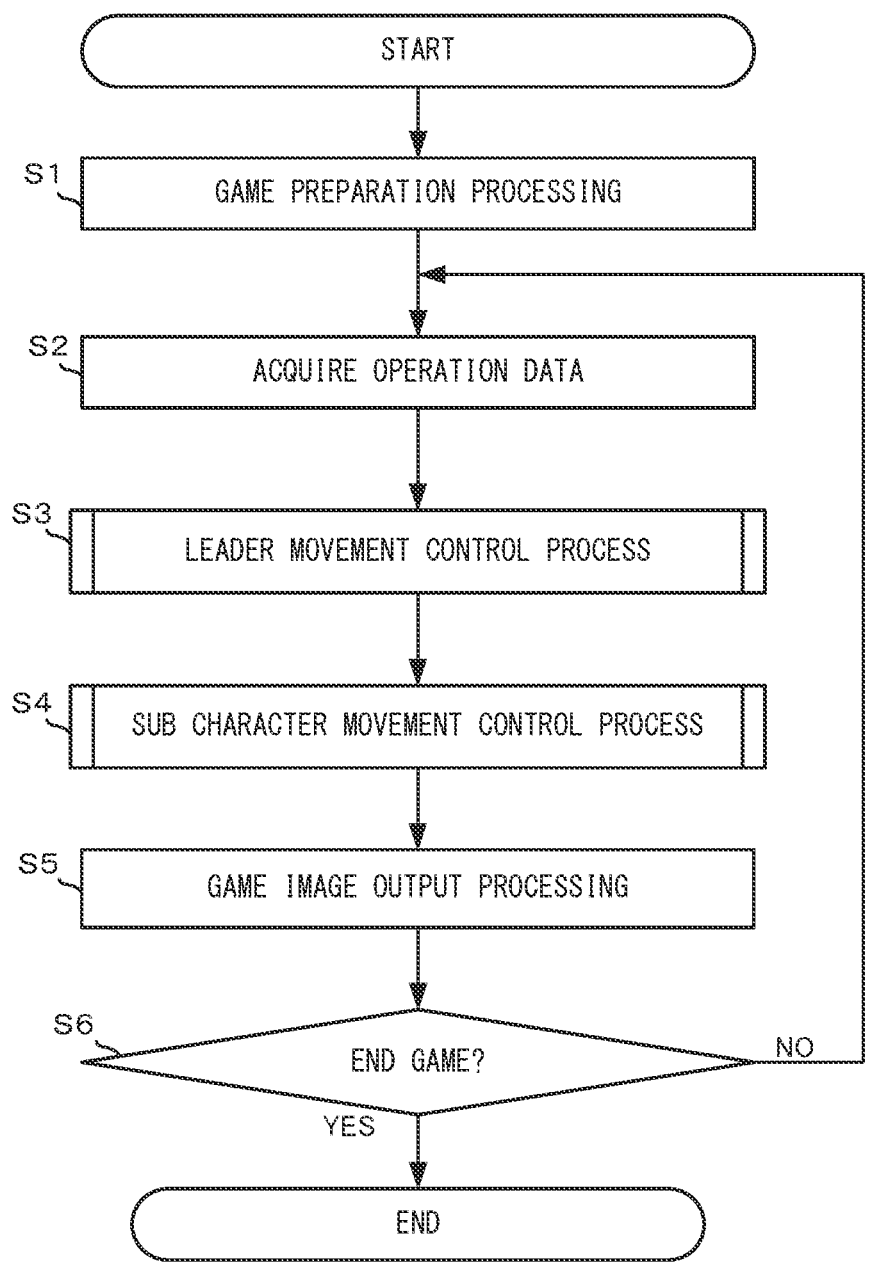
FIG. 22 is a flowchart showing a non-limiting example of the details of game processing according to the exemplary embodiment.

FIG. 22 is a flowchart showing the details of the game processing in the exemplary embodiment. A processing loop from step S2 to step S6 in FIG. 22 is repeatedly executed every frame.

[Preparation Processing]

First, in step S1, the processor 81 executes game preparation processing for preparation for starting the game. In this processing, a virtual three-dimensional space including a game field is created and various objects such as a terrain object, a leader character, and a sub character are placed. Then, the virtual space in which the various objects are placed is captured by a virtual camera, to generate a game image, and the image is outputted to a stationary monitor or the like. In addition, various data to be used in the subsequent processing are initialized. Specifically, the footprint follow-up flag is set to be OFF. In addition, the footprint N1 is set in the processing target footprint information 316. In addition, a footprint timer starts counting. The footprint timer is a timer for storing footprint data every 10 frames.

[Movement Control Process for Leader Character]

Figure 23:
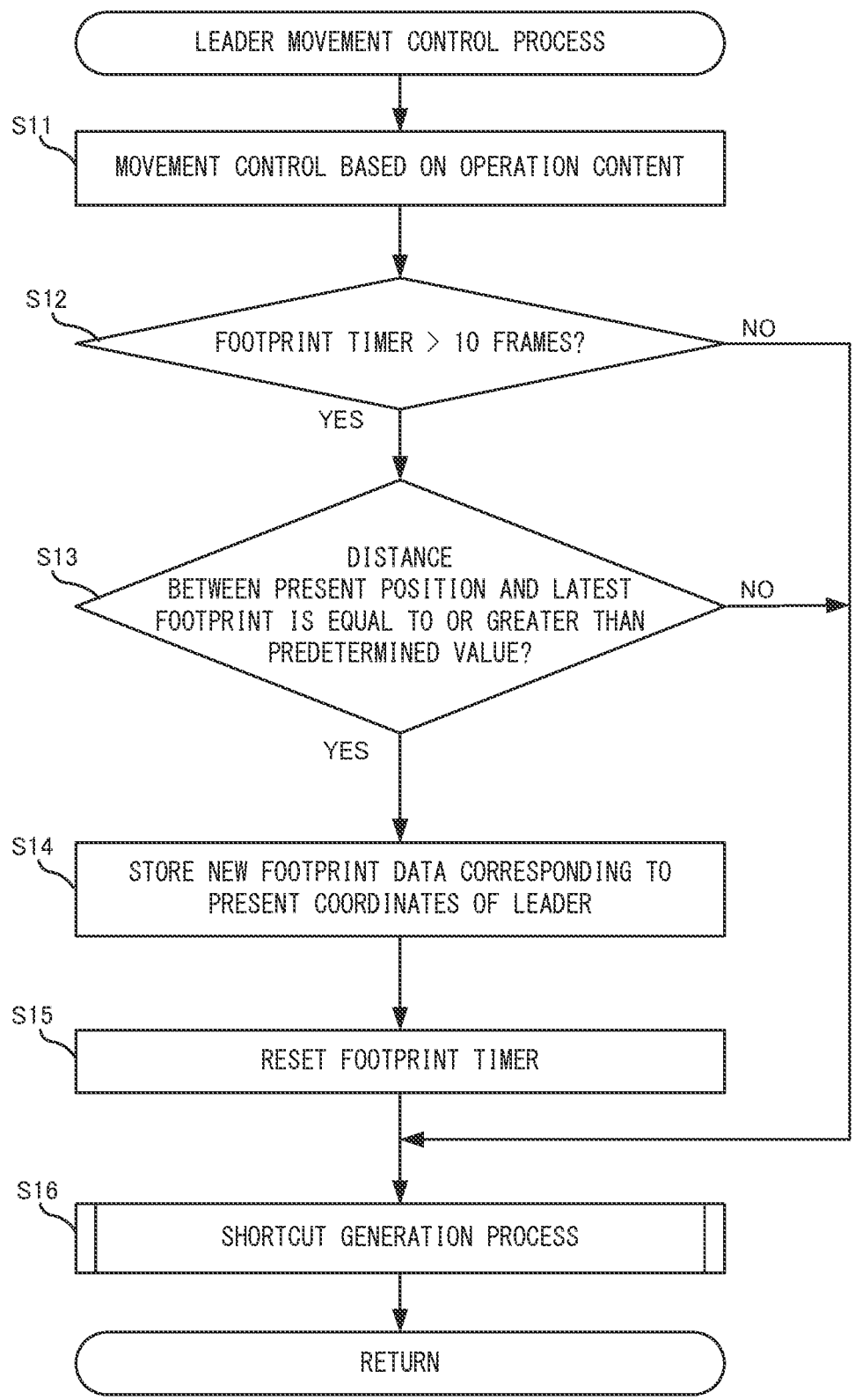
FIG. 23 is a flowchart showing a non-limiting example of the details of a leader movement control process.

Next, in step S2, the processor 81 acquires the operation data 317. Next, in step S3, the processor 81 executes a leader movement control process. FIG. 23 is a flowchart showing the details of the leader movement control process. In FIG. 23, first, in step S11, the processor 81 updates the leader coordinates and the orientation vector on the basis of the operation content indicated by the operation data 317, thus performing movement control of the leader character.

Next, in step S12, the processor 81 determines whether or not the count value of the footprint timer has exceeded a predetermined value. In the exemplary embodiment, the predetermined value is 10 frames. As a result of the determination, if the count value has not exceeded 10 frames (NO in step S12), the process proceeds to step S16 described later.

On the other hand, if the count value has exceeded 10 frames (YES in step S12), in step S13, the processor 81 determines whether or not the distance between the present coordinates of the leader character and the coordinates of the latest footprint is equal to or greater than a predetermined value. The coordinates of the latest footprint may be acquired from the footprint whose timestamp is the newest among a plurality of footprint data included in the footprint management data 315. As a result of the determination, if the distance is not equal to or greater than the predetermined value (NO in step S13), the process proceeds to step S16 described later.

On the other hand, as a result of the determination in step S13, if the distance is equal to or greater than the predetermined value (YES in step S13), in step S14, the processor 81 stores the present coordinates of the leader character and the present timestamp as new footprint data in the footprint management data 315. Here, in a case where ten footprint data have already been stored in the footprint management data 315, the new footprint data is written over the area where the footprint data whose timestamp is the oldest is stored.

Next, in step S15, the processor 81 resets the footprint timer, to start counting again.

Next, in step S16, the processor 81 performs the shortcut generation process. In this process, the above-described ray casts are performed to other footprints from each footprint stored at present, and whether or not there is a shortcut is determined and stored.

[Shortcut Generation Process]

Figure 24:
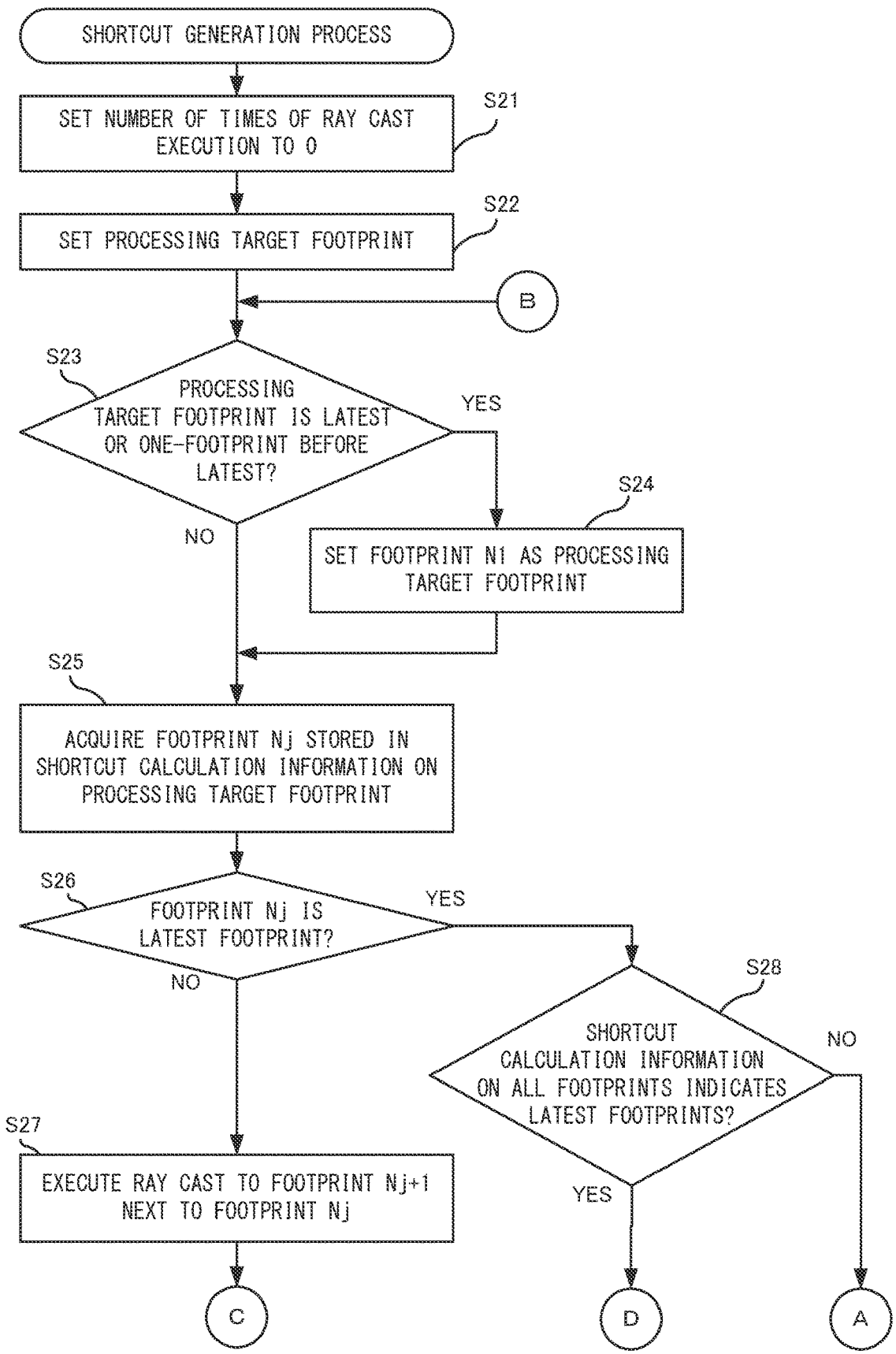
FIG. 24 is a flowchart showing a non-limiting example of the details of a shortcut generation process.
Figure 25:
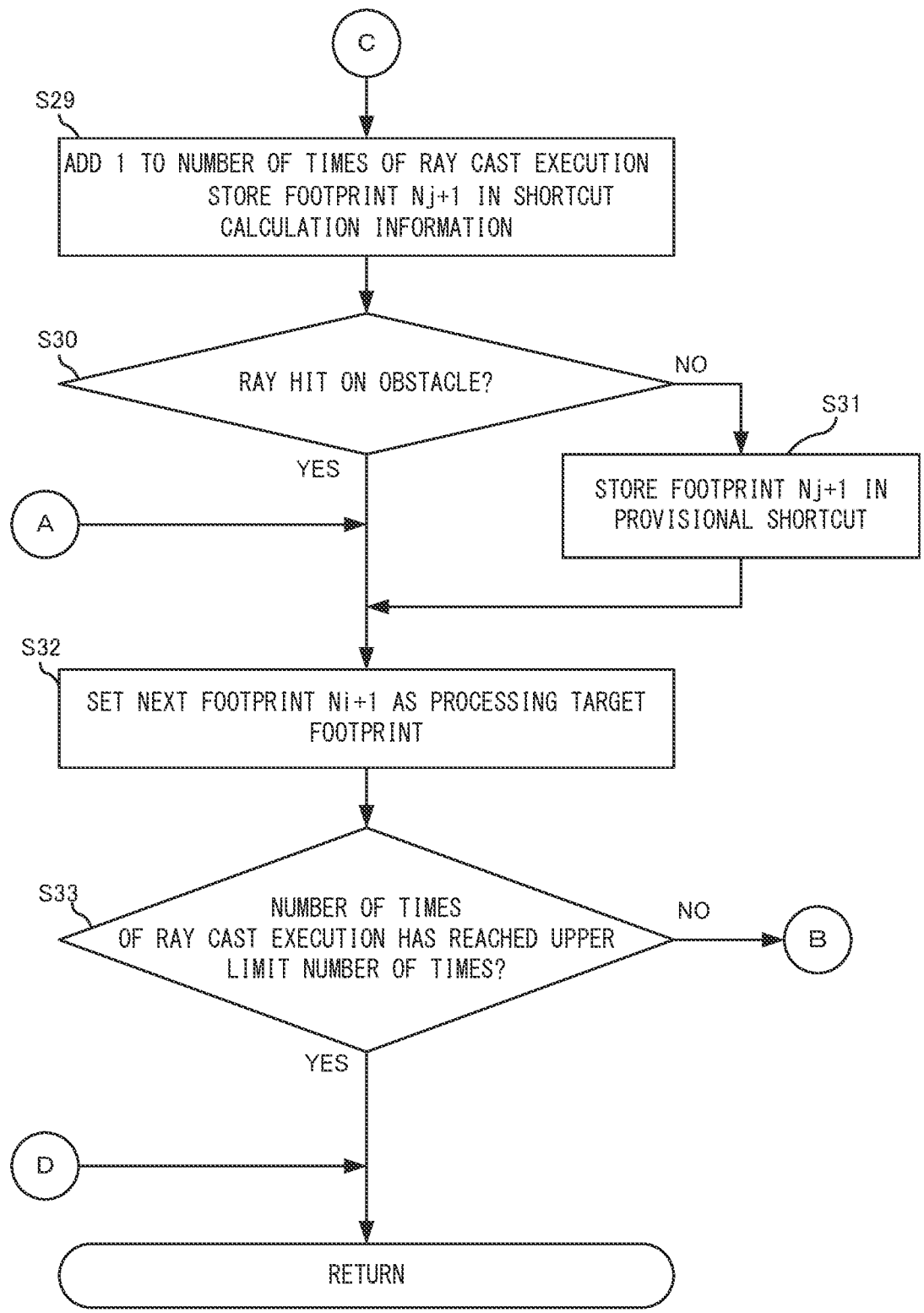
FIG. 25 is a flowchart showing a non-limiting example of the details of the shortcut generation process.

FIG. 24 and FIG. 25 are flowcharts showing the details of the shortcut generation process. Here, in the following description, a "footprint Ni (or processing target footprint Ni)" refers to a footprint as a base from which a ray is cast in the ray cast. In addition, a footprint as a destination to which a ray is cast from the footprint Ni is referred to as a "footprint Nj" (j is a positive integer). In addition, as an initial value of the footprint Nj, information indicating the footprint next to the processing target footprint Ni as described later is set.

In FIG. 24, first, in step S21, the processor 81 sets the "number of times of ray cast execution" which is a variable, to 0. This variable is a variable for counting the number of times the ray cast has been executed in processing corresponding to one frame. Here, in the exemplary embodiment, considering that the processing load of the ray cast processing is generally high, the number of times the ray cast is executed in processing corresponding to one frame is limited. In the exemplary embodiment, it is assumed that the above number of times (hereinafter, referred to as an upper limit number of times) is two, as an example.

In addition, in the exemplary embodiment, it is assumed that the number of times a ray is cast from the footprint Ni to another footprint (hereinafter, number of times of execution for each footprint) in processing corresponding to one frame is "one", as an example. That is, after one ray is cast from the footprint Ni to another footprint, next, the process shifts to processing of casting a ray from a footprint Ni+1 next to the footprint Ni to another footprint. This just means that only one ray is cast from the footprint Ni in one time of processing, and since the shortcut generation process is repeatedly executed across frames, rays are to be eventually cast from the footprint Ni to a plurality of footprints (all footprints stored after the footprint Ni), as described later. In another exemplary embodiment, the number of times of execution for each footprint may be two or more. For example, in processing corresponding to one frame, rays may be cast from the footprint Ni to two or more other footprints.

In accordance with setting (two times) of the upper limit number of times of ray cast execution per frame and setting (one time) of the number of times of execution for each footprint as described above, shortcut determinations for all the footprints stored in the footprint management data 315 are performed divisionally across a plurality of frames. For example, in the exemplary embodiment, in processing corresponding to a given frame, a ray cast from the footprint N1 to the footprint N3 and a ray cast from the footprint N2 to the footprint N4 are executed. Then, in processing corresponding to the next frame, a ray cast from the footprint N3 to the footprint N5 and a ray cast from the footprint N4 to the footprint N6 are executed. Subsequently, in each frame, a ray cast is executed once for each footprint and twice in total. Alternatively, for example, in a case where the upper limit number of times is six and the number of times of execution for each footprint is two, in a given frame, a ray cast is performed twice for each of the footprints N1, N2, N3, and in the next frame, a ray cast is performed twice for each of the footprints N4, N5, N6. For the determination as to whether or not there is a shortcut as described above, a real-time degree is not highly required. Therefore, instead of performing shortcut determination for all the footprints in processing for one frame, the determination is performed through processing across a plurality of frames, whereby it is possible to efficiently perform shortcut determination while reducing the processing load.

Next, in step S22, the processor 81 determines the footprint Ni (hereinafter, processing target footprint Ni) that is a processing target. Specifically, the footprint Ni indicated by the processing target footprint information 316 is set as the processing target footprint Ni.

Next, in step S23, the processor 81 determines whether or not the processing target footprint Ni is the latest footprint or one-footprint before the latest one among the footprint data stored in the footprint management data. As a result of the determination, if the processing target footprint Ni is such a footprint (YES in step S23), in step S24, the processor 81 determines the footprint N1 to be the processing target footprint Ni. This is because it is meaningless to calculate a shortcut for such a footprint and wasteful processing is to be omitted. For example, at a given time, in a case where data of the footprints N1 to N10 are stored in time series, there are no shortcuts from the footprints N9 and N10 and therefore shortcut calculation is not needed. In this case, for example, processing is performed for the footprints N1 to N8 through four frames, and in the next frame, the footprints N9 and N10 are skipped and the processing target is returned to the footprint N1. That is, in the fifth frame, the shortcut generation process is performed for the footprints N1 and N2.

On the other hand, as a result of the above determination, if the processing target footprint Ni is not such a footprint (NO in step S23), the processing in step S24 is skipped.

After the processing target footprint Ni is determined, a footprint as a destination to which a ray is cast from the processing target footprint Ni is specified and ray cast processing is performed. Specifically, first, in step S25, the processor 81 acquires the footprint Nj stored in the shortcut calculation information on the processing target footprint Ni. That is, the processor 81 acquires information on the last footprint to which a ray was cast in the processing corresponding to the previous frame.

Next, in step S26, the processor 81 determines whether or not the footprint Nj is the latest footprint. When the footprint Nj is the latest footprint, calculation for shortcuts from the footprint Ni to other footprints has already been completed. If the footprint Nj is not the latest footprint (NO in step S26), in step S27, the processor 81 specifies a footprint Nj+1 which is the footprint next to the footprint Nj. Then, the processor 81 executes a ray cast from the processing target footprint to the footprint Nj+1.

Next, in step S29 in FIG. 25, the processor 81 adds 1 to the variable "number of times of ray cast execution". Further, the processor 81 stores footprint information to be the footprint Nj+1, in the shortcut calculation information on the processing target footprint Ni.

Next, in step S30, the processor 81 determines whether or not a ray cast has failed, i.e., whether or not a ray has collided with an obstacle on the way. As a result of the determination, if a ray has not collided with an obstacle (a ray cast has succeeded) (NO in step S30), in step S31, the processor 81 stores footprint information to be the footprint Nj+1, in the provisional shortcut on the processing target footprint. Then, the process proceeds to step S32. On the other hand, if a ray has collided with an obstacle (a ray cast has failed) (YES in step S30), the processing in step S31 is skipped and the process proceeds to the next step.

Returning to FIG. 24, on the other hand, as a result of the determination in step S26, if the footprint Nj is the latest footprint (YES in step S26), next, in step S28, the processor 81 determines whether or not the contents of the shortcut calculation information on all the footprints in the footprint management data 315 indicate the latest footprints. That is, the processor 81 determines whether or not shortcut calculation has finished for all the footprints Ni. As a result of the determination, if not all the contents indicate the latest footprints (NO in step S28), the process proceeds to step S32 described later. On the other hand, if all the contents indicate the latest footprints (YES in step S28), the processor 81 ends the shortcut generation process.

If the above ray cast processing has finished, next, in step S32 in FIG. 25, the processor 81 sets the footprint (footprint Ni+1) next to the present processing target footprint Ni, as the next processing target footprint (update).

Next, in step S33, the processor 81 determines whether or not the variable "number of times of ray cast execution" has reached the upper limit number of times (in this example, two) defined in advance. As a result of the determination, if the variable has not reached the upper limit number of times yet (NO in step S33), the process returns to step S23 so as to be repeated. On the other hand, if the variable has reached the upper limit number of times (YES in step S33), the processor 81 ends the shortcut generation process.

Returning to FIG. 23, when the shortcut generation process has finished, the processor 81 ends the leader movement control process.

[Movement Control Process for Sub Character]

Figure 26:
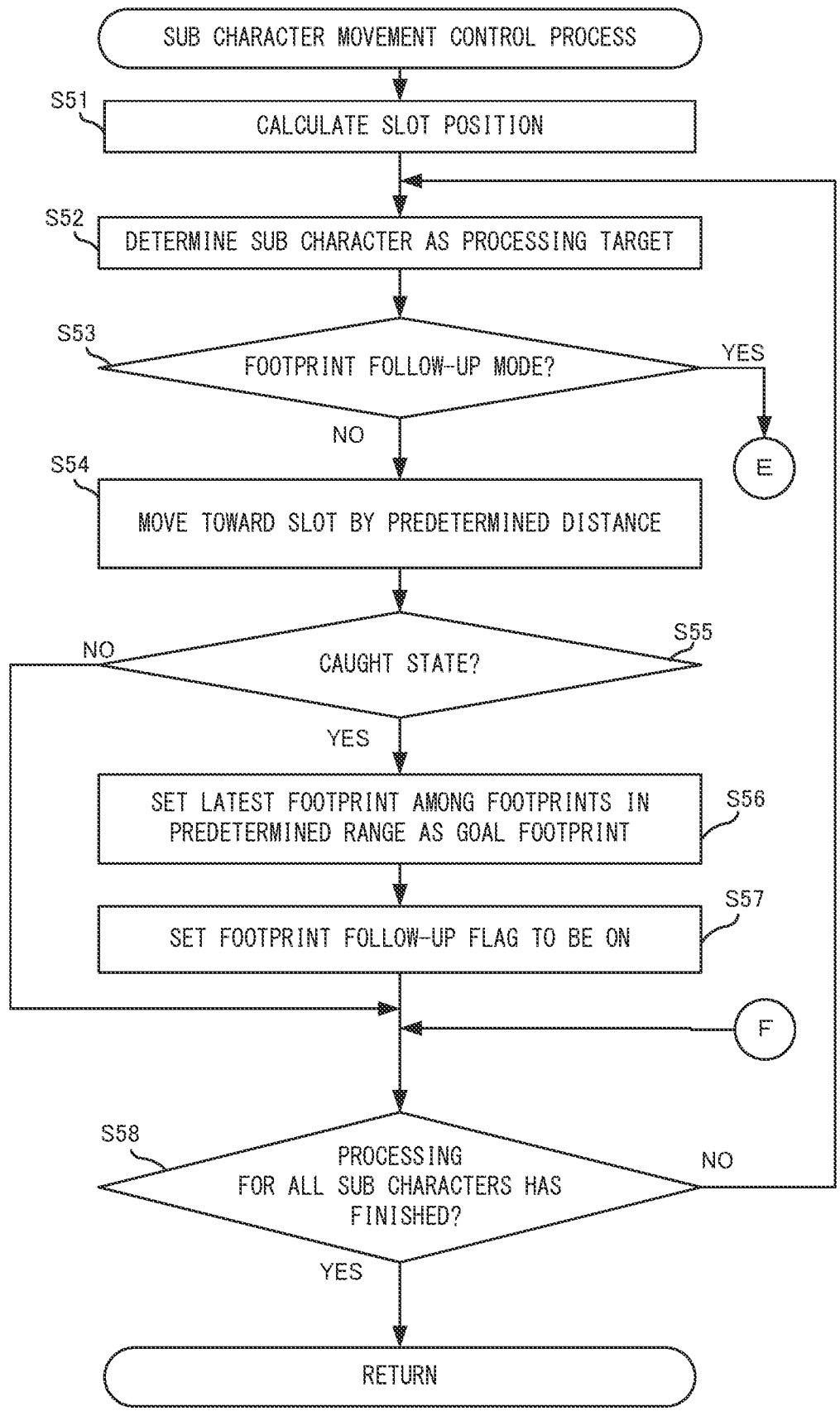
FIG. 26 is a flowchart showing a non-limiting example of the details of a sub character movement control process.
Figure 27:
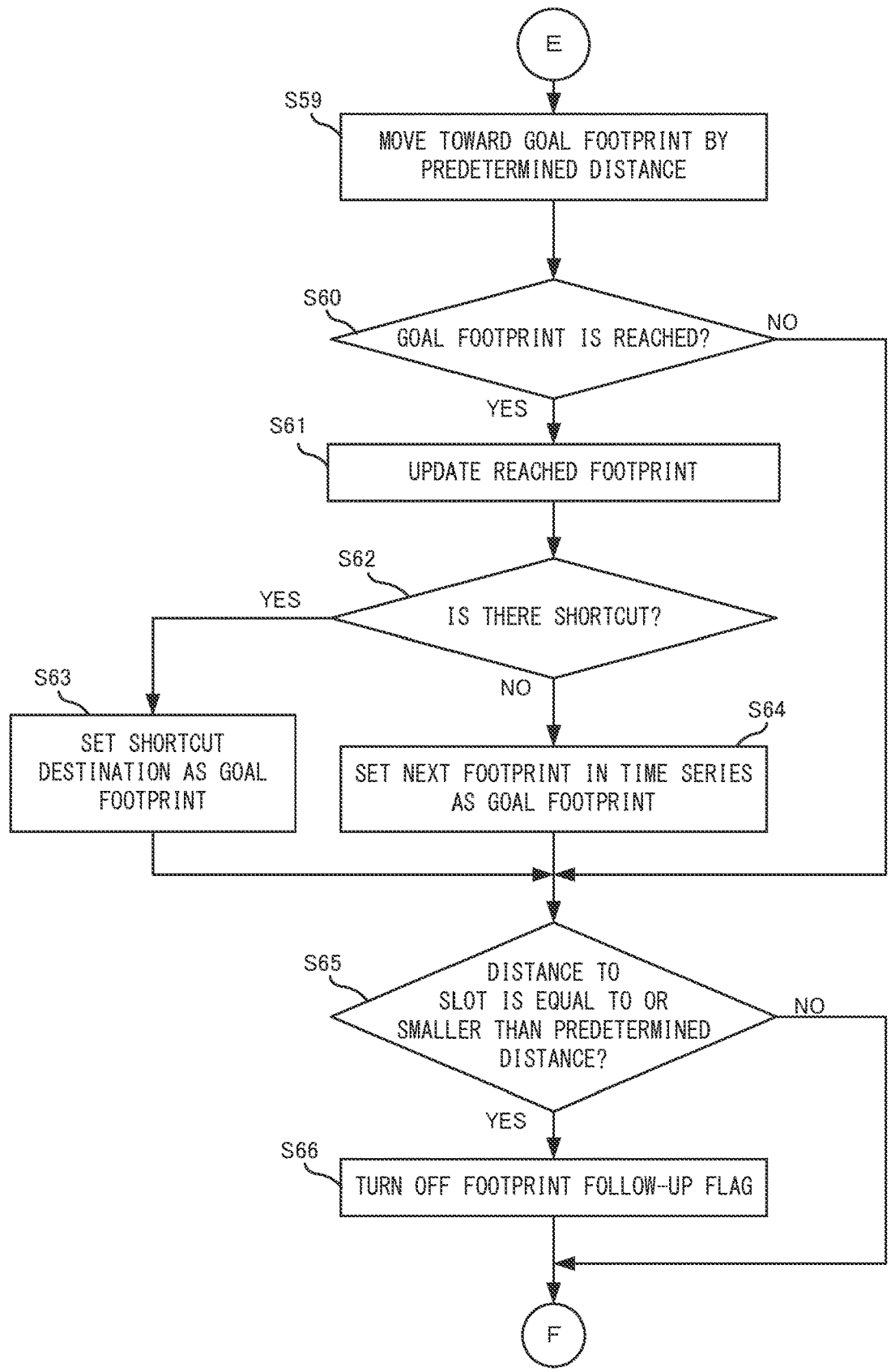
FIG. 27 is a flowchart showing a non-limiting example of the details of the sub character movement control process.

Returning to FIG. 22, when the leader movement control process has finished, next, in step S4, the processor 81 executes a sub character movement control process. FIG. 26 and FIG. 27 are flowcharts showing the details of the sub character movement control process. In FIG. 26, first, in step S51, the processor 81 calculates the position of each slot. For example, the processor 81 calculates the coordinates of each slot on the basis of relative coordinates of each slot defined in advance, the leader coordinates, and the orientation vector.

Next, in step S52, the processor 81 determines one sub character to be a target of processing described below. In other words, processing in steps S53 to S66 described below is repeated the same number of times as the number of sub characters.

Next, in step S53, the processor 81 determines whether or not the footprint follow-up flag for the sub character (hereinafter, referred to as a processing target character) determined as a processing target is ON. As a result of the determination, if the footprint follow-up flag is OFF (NO in step S53), the movement control using the slot described above is performed (slot mode). Specifically, first, in step S54, the processor 81 moves the processing target character in a direction toward the slot associated with the processing target character, by a predetermined distance.

Next, in step S55, the processor 81 determines whether or not the processing target character is in a "caught state". The "caught state" is a state in which advancement of the processing target character toward the slot is hampered by an obstacle such as a terrain, as shown in FIG. 11. In the exemplary embodiment, whether or not the processing target character is in a caught state is determined as follows, for example. First, in a case where the coordinates of the processing target character have not changed for a predetermined period or longer (even though the movement control as described above has been performed), the processing target character is determined to be in a caught state. In addition, also in a case where the processing target character has been colliding with (hitting) an obstacle such as a terrain for a predetermined period or longer, the processing target character is determined to be in a caught state. Regarding determination for such a predetermined period, a counter for counting the period may be prepared for each sub character and the count value may be compared with a predetermined comparison value. As a result of the determination, if the processing target character is not in a "caught state" (NO in step S55), the process proceeds to step S58 described later.

On the other hand, if the processing target character is in a "caught state" (YES in step S55), in step S56, the processor 81 sets, as a goal footprint, the newest footprint among footprints present in a predetermined range around the present position of the processing target character.

Next, in step S57, the processor 81 sets the footprint follow-up flag for the processing target character to be ON. Thus, the movement control for the processing target character switches to the footprint follow-up mode from the next frame. Then, the process proceeds to step S58 described later.

On the other hand, as a result of the determination in step S53, if the footprint follow-up flag for the processing target character is ON (YES in step S53), the movement control using the footprint described above is performed (footprint follow-up mode). Specifically, in step S59 in FIG. 27, the processor 81 calculates a direction to the goal footprint from the present position of the processing target character. Then, the processor 81 moves the processing target character in the calculated direction by a predetermined distance.

Next, in step S60, the processor 81 determines whether or not the processing target character has reached the goal footprint as a result of movement of the processing target character in step S59. As a result of the determination, if the processing target character has not reached the goal footprint (NO in step S60), the process proceeds to step S65 described later.

On the other hand, if the processing target character has reached the goal footprint (YES in step S60), the processor 81 stores information indicating the goal footprint, as the "latest reached footprint" of the processing target character. Specifically, the processor 81 reads the timestamp of the footprint data corresponding to the goal footprint from the footprint management data 315, and stores the timestamp as the "latest reached footprint" of the processing target character.

Next, in step S62, the processor 81 determines whether or not there is a shortcut on the reached goal footprint. Specifically, the processor 81 determines whether or not information on a footprint as a shortcut destination has been set in the provisional shortcut of the goal footprint. As a result of the determination, if there is a shortcut (YES in step S62), in step S63, the processor 81 sets the footprint at the shortcut destination as a goal footprint. Then, the process proceeds to step S65.

On the other hand, as a result of the determination in step S62, if there is no shortcut set on the reach goal footprint (NO in step S62), in step S64, the processor 81 extracts a footprint (a footprint located next in time series) having a newer timestamp next to the latest reached footprint, from a plurality of footprints stored in the footprint management data 315. Then, the processor 81 sets the extracted footprint as the next goal footprint.

Next, in step S65, the processor 81 determines whether or not a distance from the present position of the processing target character to the goal slot is equal to or smaller than a predetermined value. As a result, if the distance is equal to or smaller than the predetermined value (YES in step S65), in step S66, the processor 81 turns off the footprint follow-up flag for the processing target character so that the processing target character will move toward the goal slot in the next frame and later. On the other hand, if the distance is not equal to or smaller than the predetermined value (NO in step S65), the processing in step S66 is skipped. Then, the process proceeds to step S58.

Returning to FIG. 26, next, in step 58, the processor 81 determines whether or not the above process has finished for all the sub characters. As a result, if there is a sub character not having undergone the process (NO in step S58), the process returns to step S52, to determine the next processing target character from the sub characters not having undergone the process, and the same process is repeated. On the other hand, if the process has finished for all the sub characters (YES in step S58), the sub character movement control process is ended.

[Game Image Output Process]

Returning to FIG. 22, when the sub character movement control process has finished, next, in step S5, the processor 81 generates a game image with the above processing reflected therein, and outputs the game image.

Next, in step S6, the processor 81 determines whether or not a game ending condition is satisfied. If the game ending condition is not satisfied (NO in step S6), the process returns to step S2, so as to be repeated. If the game ending condition is satisfied (YES in step S6), the game processing is ended.

Thus, the detailed description of the game processing according to the exemplary embodiment has finished.

As described above, in the exemplary embodiment, movement of a sub character is basically controlled in the slot movement mode, and in a case where advancement of the sub character is hampered by an obstacle, the control is shifted to the footprint follow-up mode. Further, while movement is being performed in the footprint follow-up mode, the shortcut control from a given footprint to another footprint as described above is also performed in combination. Thus, in a case where the sub character is moving in the footprint follow-up mode, a time until the sub character catches up with the leader character can be shortened. In addition, a scene in which the sub character moves with a more natural behavior can be represented.

The processing in the above exemplary embodiment can be applied even in a case where there is only one sub character, but is particularly useful in such game processing in which there are multiple sub characters. That is, in a case of performing movement control of multiple sub characters individually so as to follow the leader character, it is possible to perform movement control with a reduced processing load, more efficiently, and with a more natural behavior, by performing the movement control using the footprint and the shortcut as described above.

In addition, as described above, in the exemplary embodiment, the shortcut generation process is performed while the footprint Ni as a processing target loops (after processing is performed until reaching the footprint N8, processing is next performed for the footprint N1). Thus, even a footprint from which a shortcut destination has been once determined repeatedly becomes a processing target thereafter, so that whether or not there is a shortcut to a position closer to the leader character is determined, whereby it becomes possible to create a shortcut based on the latest footprint condition.

[Modifications]

In the above exemplary embodiment, as an example of a ray cast, processing of casting a line from a given footprint to another footprint (called Line Trace) has been described. In another exemplary embodiment, as processing of the ray cast, a sphere may be cast instead of a line. In this case, the radius of the sphere may be the same as the radius of a sub character, or may be a slightly greater value. Thus, determination as to whether or not it is possible to take a shortcut can be performed more accurately. That is, the determination is performed with a greater width than in a case of a line, and therefore it is possible to prevent occurrence of such a situation that advancement of the sub character is hampered by the sub character being caught on an obstacle on the way while moving through a shortcut from a given footprint to another footprint. In addition, in a case of performing a ray cast using a sphere as described above, a path used as a shortcut is not limited to a straight path and may be a curved path within a range determined on the basis of the diameter of the sphere.

In the above exemplary embodiment, in the footprint follow-up mode, the footprint coordinates of the footprint data are merely used as a goal footprint. Alternatively, for example, coordinates slightly offset from the footprint coordinates of the footprint data may be set as the goal coordinates. In this case, the offset coordinates may be coordinates within such a range that it can be determined that the "caught state" does not occur on the basis of a fact that the leader object has actually passed.

In the above shortcut generation process, the order in which a ray is cast from a given footprint to another footprint is an order from the oldest footprint in time series. That is, in a case of casting a ray from the footprint N1, a ray cast is performed in the order of the footprint N3, the footprint N4, the footprint N5, . . . , etc. In another exemplary embodiment, a ray cast may be performed in the order from the newest footprint. For example, in a case of casting a ray from the footprint N1, a ray cast may be performed in the order of the footprint N10, the footprint N9, the footprint N8, . . . , etc. In this case, when a footprint to which a shortcut can be performed is found, calculation processing for the subsequent footprints becomes unnecessary. Therefore, this method can be more efficient in such a situation that the update frequency of the latest footprint is low, for example.

In the above exemplary embodiment, the shortcut generation process is executed per one frame. The execution interval of the shortcut generation process is not limited thereto. In another exemplary embodiment, the shortcut generation process may be executed every predetermined number of frames such as 5 frames or 10 frames, for example.

In the above exemplary embodiment, in processing corresponding to one frame, the number of times of ray cast execution is up to the upper limit number of times. In another exemplary embodiment, the upper limit number of times may be changed in accordance with the processing load at each time. For example, in a certain frame, a ray cast may be executed with the upper limit number of times set at two, and in another frame, if the processing load is low and the processing capacity has some margin, the upper limit number of times for the processing corresponding to that frame may be set at four, five, etc., and thus the number of times of ray cast execution may be dynamically increased.

Whether the processing load is high or low may be determined in accordance with how many objects (polygons) are to be drawn in that frame, for example. In the same manner, the number of times of execution for each footprint may also be changed in accordance with the processing load at each time.

In the above exemplary embodiment, the case where the sequential processing in the game processing is executed by a single main body apparatus 2 has been described. In another exemplary embodiment, the sequential processing may be executed in an information processing system including a plurality of information processing apparatuses. For example, in an information processing system including a terminal-side apparatus and a server-side apparatus that can communicate with the terminal-side apparatus via a network, a part of the sequential processing may be executed by the server-side apparatus. In an information processing system including a terminal-side apparatus and a server-side apparatus that can communicate with the terminal-side apparatus via a network, a major part of the sequential processing may be executed by the server-side apparatus and a part of the sequential processing may be executed by the terminal-side apparatus. In the information processing system, a server-side system may include a plurality of information processing apparatuses and processing to be executed on the server side may be executed by the plurality of information processing apparatuses in a shared manner. A configuration of so-called cloud gaming may be adopted. For example, the main body apparatus 2 may transmit operation data indicating a user's operation to a predetermined server, various game processing may be executed on the server, and the execution result may be distributed as a video and a sound by streaming to the main body apparatus 2.

While the present disclosure has been described herein, it is to be understood that the above description is, in all aspects, merely an illustrative example, and is not intended to limit the scope thereof. It is to be understood that various modifications and variations can be made without deviating from the scope of the present disclosure.

What is claimed is:

1. A computer-readable non-transitory storage medium having stored therein an information processing program for causing a computer of an information processing apparatus to execute information processing in which a first object moves in a virtual space and at least one second object moves in accordance with movement of the first object, the program causing the computer to:

perform movement control of the first object to a first object coordinate set which is a coordinate set in the virtual space, on the basis of an operation input;

along with the movement control of the first object, repeatedly acquire footprint coordinate sets which are coordinate sets based on the first object coordinate set, a plurality of times, and store the footprint coordinate sets in an order of time series;

for a first footprint coordinate set among the acquired plurality of footprint coordinate sets, determine whether or not a path connecting the first footprint coordinate set and a second footprint coordinate set stored later in time series than the first footprint coordinate set is passable, and if the path is determined to be passable, store information specifying the path in association with the first footprint coordinate set; and perform movement control of the second object so as to track the acquired footprint coordinate sets in time series, and further, on a predetermined footprint coordinate set, if there is the path determined to be passable, perform movement control of the second object so as to pass through the path.

2. The computer-readable non-transitory storage medium according to claim 1, wherein in determining whether or not the path connecting the first footprint coordinate set and the second footprint coordinate set is passable, whether or not a straight path connecting the first and second footprint coordinate sets is passable is determined.

3. The computer-readable non-transitory storage medium according to claim 1, wherein if there are a plurality of the second footprint coordinate sets to which the paths are determined to be passable from the first footprint coordinate set, information specifying the path to the latest second footprint coordinate set in time series is stored in association with the first footprint coordinate set.

4. The computer-readable non-transitory storage medium according to claim 3, wherein in determining whether or not the path connecting the first footprint coordinate set and the second footprint coordinate set is passable, in every predetermined number of frames, a predetermined number of coordinate sets among the plurality of footprint coordinate sets are used as the first footprint coordinate sets, and whether or not the paths connecting each first footprint coordinate set and a predetermined number of the second footprint coordinate sets are passable is determined.

5. The computer-readable non-transitory storage medium according to claim 4, wherein the predetermined numbers are changed in accordance with a processing load.

6. The computer-readable non-transitory storage medium according to claim 1, the information processing program further causing the computer to:

perform follow-up movement control of the second object so as to move toward a movement goal coordinate set based on the first object coordinate set;

detect whether the second object is unable to reach the movement goal coordinate set during the follow-up movement control;

if it is detected that the second object is unable to reach the movement goal coordinate set, perform movement control of the second object so as to move toward one of the footprint coordinate sets; and after the second object has reached the one of the footprint coordinate sets through the movement control, perform movement control of the second object so as to track the footprint coordinate sets in time series.

7. The computer-readable non-transitory storage medium according to claim 6, wherein if a coordinate set of the second object has not changed for a predetermined period or longer or if it is detected that the second object has continued colliding with an obstacle object for a predetermined period or longer, the second object is determined to be unable to reach the movement goal coordinate set.

8. The computer-readable non-transitory storage medium according to claim 6, wherein if it is detected that the second object is unable to reach the movement goal coordinate set, the second object is subjected to movement control so as to move toward a latest footprint coordinate set present in a predetermined range from a coordinate set of the second object.

9. The computer-readable non-transitory storage medium according to claim 1, wherein in determining whether or not the path connecting the first footprint coordinate set and the second footprint coordinate set is passable, among the acquired plurality of footprint coordinate sets, a footprint coordinate set stored last in time series and a footprint coordinate set stored one-set before the last are not used as the first footprint coordinate sets and also are not subjected to determination as to whether or not the path to the second footprint coordinate set is passable.

10. An information processing system for executing information processing in which a first object moves in a virtual space and at least one second object moves in accordance with movement of the first object, the information processing system comprising a processor and a memory coupled thereto, the processor being configured to control the information processing system to at least execute:

performing movement control of the first object to a first object coordinate set which is a coordinate set in the virtual space, on the basis of an operation input;

along with the movement control of the first object, repeatedly acquiring footprint coordinate sets which are coordinate sets based on the first object coordinate set, a plurality of times, and storing the footprint coordinate sets in an order of time series;

for a first footprint coordinate set among the acquired plurality of footprint coordinate sets, determining whether or not a path connecting the first footprint coordinate set and a second footprint coordinate set stored later in time series than the first footprint coordinate set is passable, and if the path is determined to be passable, storing information specifying the path in association with the first footprint coordinate set; and performing movement control of the second object so as to track the acquired footprint coordinate sets in time series, and further, on a predetermined footprint coordinate set, if there is the path determined to be passable, performing movement control of the second object so as to pass through the path.

11. An information processing method for causing a computer of an information processing apparatus to execute information processing in which a first object moves in a virtual space and at least one second object moves in accordance with movement of the first object, the method causing the computer to:

perform movement control of the first object to a first object coordinate set which is a coordinate set in the virtual space, on the basis of an operation input;

along with the movement control of the first object, repeatedly acquire footprint coordinate sets which are coordinate sets based on the first object coordinate set, a plurality of times, and store the footprint coordinate sets in an order of time series;

for a first footprint coordinate set among the acquired plurality of footprint coordinate sets, determine whether or not a path connecting the first footprint coordinate set and a second footprint coordinate set stored later in time series than the first footprint coordinate set is passable, and if the path is determined to be passable, store information specifying the path in association with the first footprint coordinate set; and perform movement control of the second object so as to track the acquired footprint coordinate sets in time series, and further, on a predetermined footprint coordinate set, if there is the path determined to be passable, perform movement control of the second object so as to pass through the path.

* * * * *